United States Patent
Jarvis et al.

(10) Patent No.: US 10,521,820 B1
(45) Date of Patent: Dec. 31, 2019

(54) SYSTEMS AND METHODS FOR PROVIDING TRANSACTION AFFINITY INFORMATION

(71) Applicant: Capital One Services, LLC, McLean, VA (US)

(72) Inventors: Daniel Alan Jarvis, Alexandria, VA (US); Lawrence Hutchison Douglas, Jr., McLean, VA (US); Jeffrey Carlyle Wieker, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/006,075

(22) Filed: Jun. 12, 2018

(51) Int. Cl.
*G06Q 30/02* (2012.01)
*G06F 16/28* (2019.01)

(52) U.S. Cl.
CPC ....... *G06Q 30/0255* (2013.01); *G06F 16/288* (2019.01); *G06Q 30/0224* (2013.01); *G06Q 30/0251* (2013.01); *G06Q 30/0252* (2013.01)

(58) Field of Classification Search
None
See application file for complete search history.

(56) References Cited

U.S. PATENT DOCUMENTS

| | | | | |
|---|---|---|---|---|
| 5,909,023 A * | 6/1999 | Ono | ..................... | G06Q 10/087 235/380 |
| 6,189,005 B1 * | 2/2001 | Chakrabarti | ........ | G06F 16/2477 |
| 6,292,786 B1 * | 9/2001 | Deaton | .............. | G06Q 20/0457 705/14.25 |
| 6,334,110 B1 * | 12/2001 | Walter | ................... | G06Q 30/02 705/14.41 |
| 6,430,539 B1 * | 8/2002 | Lazarus | ................. | G06Q 30/02 705/14.1 |
| 7,801,843 B2 * | 9/2010 | Kumar | ................... | G06Q 10/04 706/61 |
| 10,217,130 B1 * | 2/2019 | Varma | ................ | G06Q 30/0252 |

(Continued)

OTHER PUBLICATIONS

A personalized recommender system based on web usage mining and decision tree induction, Cho et al., Expert System with Applications, 2002.*

(Continued)

*Primary Examiner* — David J Stoltenberg
(74) *Attorney, Agent, or Firm* — Harrity & Harrity, LLP

(57) ABSTRACT

In certain aspects, the disclosed implementations include methods and systems for dynamically generating and providing transaction affinity recommendation data. In certain implementations, the transaction affinity recommendation data may include information that identifies a target merchant and associated merchant promotion data that may be generated based on a dynamic analysis of transaction data corresponding to an account record. The disclosed implementations may determine temporal relationships between pairs of sequential transactions corresponding to the account record, and based on such relationships, may identify pairs of transactions involving separate merchants. The disclosed implementations may determine affinity relationships associated with one or more pairs of the temporally related transactions and a target merchant, and based on such relationships, generate and provide the transaction affinity recommendation data.

20 Claims, 20 Drawing Sheets

(56) References Cited

U.S. PATENT DOCUMENTS

| | | | | |
|---|---|---|---|---|
| 2005/0159996 A1* | 7/2005 | Lazarus | G06Q 30/02 | 705/7.31 |
| 2010/0280880 A1* | 11/2010 | Faith | G06Q 10/06375 | 705/7.37 |
| 2010/0280881 A1* | 11/2010 | Faith | G06Q 10/06375 | 705/7.34 |
| 2010/0280882 A1* | 11/2010 | Faith | G06Q 10/06375 | 705/7.37 |
| 2010/0280927 A1* | 11/2010 | Faith | G06Q 10/06375 | 705/30 |
| 2010/0280950 A1* | 11/2010 | Faith | G06Q 10/06375 | 705/44 |
| 2011/0035288 A1* | 2/2011 | Clyne | G06Q 30/02 | 705/14.71 |
| 2011/0090080 A1* | 4/2011 | Yu | G06Q 30/0201 | 340/539.13 |
| 2011/0231225 A1* | 9/2011 | Winters | G06Q 20/10 | 705/7.29 |
| 2011/0231257 A1* | 9/2011 | Winters | G06Q 30/02 | 705/14.53 |
| 2011/0264501 A1* | 10/2011 | Clyne | G06Q 20/10 | 705/14.25 |
| 2012/0059702 A1* | 3/2012 | Yoder | G06Q 30/02 | 705/14.17 |
| 2012/0066064 A1* | 3/2012 | Yoder | G06Q 30/00 | 705/14.53 |
| 2012/0094639 A1* | 4/2012 | Carlson | H04W 4/029 | 455/414.1 |
| 2012/0136704 A1* | 5/2012 | Carlson | G06Q 30/02 | 705/14.17 |
| 2013/0191213 A1* | 7/2013 | Beck | G06Q 30/0267 | 705/14.53 |
| 2013/0275222 A1* | 10/2013 | Amaro | G06Q 20/102 | 705/14.58 |
| 2014/0180811 A1* | 6/2014 | Boal | G06Q 30/0245 | 705/14.53 |
| 2014/0222506 A1* | 8/2014 | Frazer | G06Q 30/02 | 705/7.29 |
| 2014/0222570 A1* | 8/2014 | Devolites | H04W 4/029 | 705/14.58 |
| 2015/0106206 A1* | 4/2015 | Vengroff | G06Q 30/02 | 705/14.58 |
| 2015/0142515 A1* | 5/2015 | Ghosh | G06Q 30/0202 | 705/7.31 |
| 2015/0287145 A1* | 10/2015 | Lee | G06Q 40/12 | 705/30 |
| 2015/0332414 A1* | 11/2015 | Unser | G06F 17/3053 | 705/30 |
| 2016/0019465 A1* | 1/2016 | Milton | H04W 4/029 | 706/52 |
| 2016/0117781 A1* | 4/2016 | Lee | G06Q 40/12 | 705/30 |
| 2016/0203211 A1* | 7/2016 | Milton | H04L 51/20 | 705/14.58 |
| 2016/0253689 A1* | 9/2016 | Milton | H04W 4/029 | 705/7.34 |
| 2016/0323711 A1* | 11/2016 | Spears | H04W 4/029 | |
| 2016/0343017 A1* | 11/2016 | Carlson | G06Q 30/0244 | |
| 2016/0350866 A1* | 12/2016 | Lee | G06F 16/134 | |
| 2017/0163655 A1* | 6/2017 | Ramalingam | H04W 4/029 | |
| 2017/0300940 A1* | 10/2017 | Faith | G06Q 10/06375 | |
| 2017/0303088 A1* | 10/2017 | Spears | H04W 4/029 | |
| 2017/0345005 A1* | 11/2017 | Faith | G06Q 10/06375 | |
| 2018/0040011 A1* | 2/2018 | Milton | G06Q 30/02 | |
| 2018/0181971 A1* | 6/2018 | MacIlwaine | G06Q 30/02 | |
| 2018/0276710 A1* | 9/2018 | Tietzen | G06N 3/08 | |

OTHER PUBLICATIONS

Discovering recency, frequency, and monetary (RFM) sequential patterns from customers' purchasing data, Chen et al., Electronic Commerce Research and Applications, Mar. 25, 2009.*

* cited by examiner

| FIRST MERCHANT | SECOND MERCHANT | TIME GAP |
|---|---|---|
| MERCHANT M1 | MERCHANT M2 | 5 MINUTES |
| MERCHANT M3 | MERCHANT M4 | 45 MINUTES |
| MERCHANT M5 | MERCHANT M6 | 23 MINUTES |
| MERCHANT M7 | MERCHANT M8 | 32 MINUTES |
| MERCHANT M9 | MERCHANT M10 | 22 MINUTES |

FIGURE 9

| FIRST MERCHANT | SECOND MERCHANT | COUNT |
|---|---|---|
| MERCHANT M1 | MERCHANT M2 | 3 |
| MERCHANT M3 | MERCHANT M4 | 2 |
| MERCHANT M20 | MERCHANT M30 | 2 |
| MERCHANT M40 | MERCHANT M80 | 2 |
| MERCHANT M90 | MERCHANT M70 | 1 |

FIGURE 11

SYSTEMS AND METHODS FOR PROVIDING TRANSACTION AFFINITY INFORMATION

BACKGROUND

Technologies for processing transaction-related data enable data to be processed to provide information to computing components for intelligent analysis and feedback to users. Monitoring transactions enables back-end and client-side systems to analyze and provide targeted feedback. The analysis provides opportunities for a computing system to process information in an efficient manner to generate and provide, for example, targeted feedback information that a user and/or computing system can evaluate for future actions or decisions.

SUMMARY

Consistent with the disclosure, systems and methods are provided for dynamically analyzing transaction data to determine, generate, and provide transaction affinity recommendation data. In some examples, the disclosed implementations may perform one or more transaction affinity processes that collect and analyze transaction information associated with one or more accounts to determine and generate transaction affinity data reflecting one or more relationships between the transactions and merchants associated with the transactions. Based on the transaction affinity relationships, the disclosed implementations may dynamically determine and provide transaction affinity recommendation data that may be used by user(s) and/or computing systems for adjusting subsequent events, actions, and processes relating to the transactions, account(s), and/or user(s). These and other exemplary aspects of the disclosed implementations are described in detail below.

It is to be understood that both the general and detailed descriptions below are exemplary and are not restrictive of the implementations and aspects of the disclosed and claimed implementations.

The accompanying drawings illustrate exemplary aspects of the disclosed implementations and, together with the descriptions below, provide explanations relating to the general and/or technical features relating to the disclosed implementations.

BRIEF DESCRIPTION OF THE DRAWINGS

FIG. 9 is a block diagram of exemplary time gap data, consistent with disclosed implementations;

FIG. 11 is a block diagram of exemplary count data, consistent with disclosed implementations;

DETAILED DESCRIPTION

Figure 1:
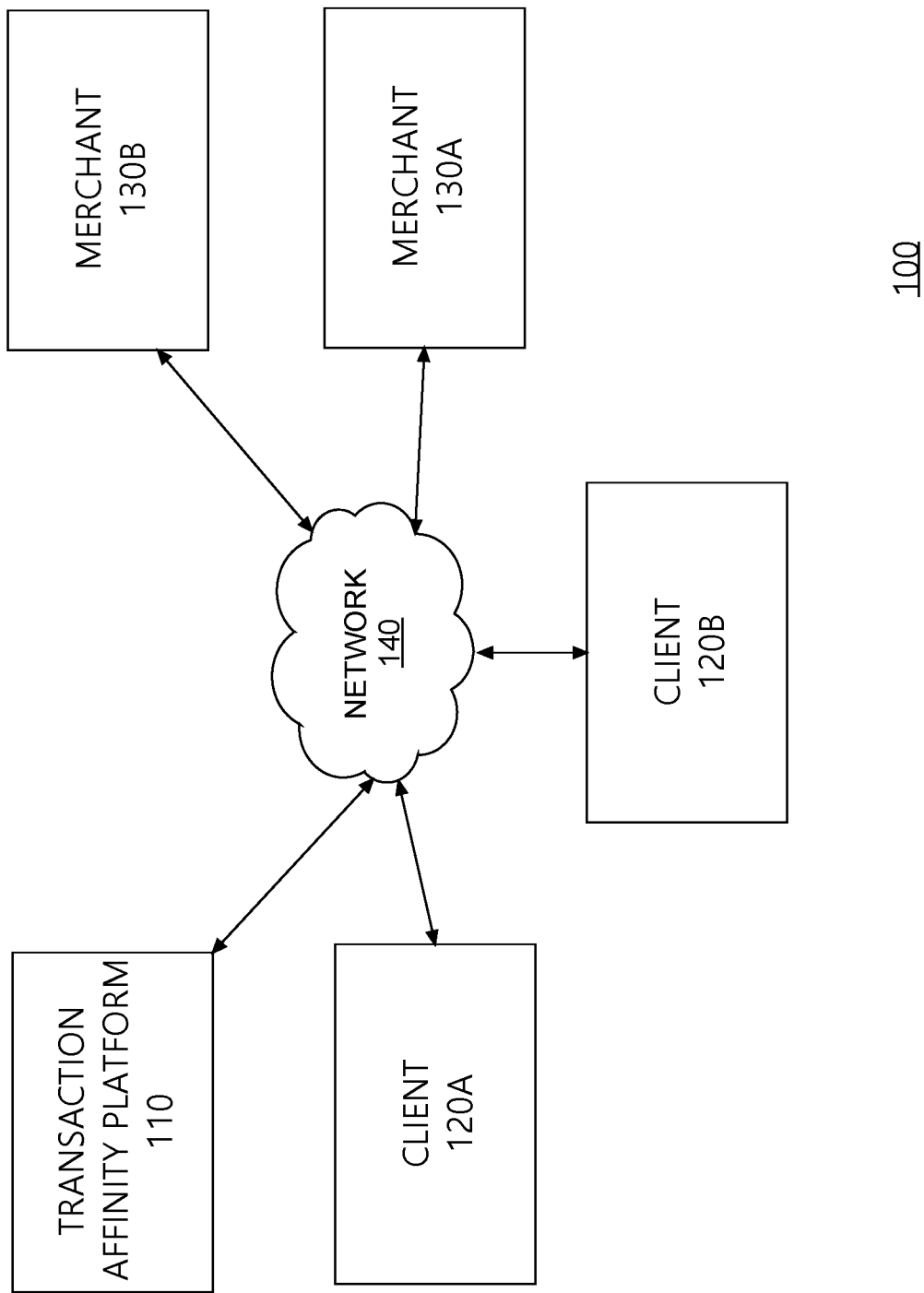
FIG. 1 is a block diagram of an exemplary system consistent with disclosed implementations.

The following detailed description of exemplary implementations refers to the accompanying drawings. The same reference numbers in different drawings may identify the same or similar components, functionalities, processes, elements, and the like.

The disclosed implementations include methods, systems, and tangible articles of manufacture that may be configured to provide, for example, transaction affinity information that may be used to provide efficient computing of transaction information. In certain aspects, the disclosed implementations may perform transaction affinity process(es) to determine transaction affinity relationship data that may be used to provide data relating to one or more recommendations concerning action and events, such as a user event involving the use of an account to perform one or more transactions in a related sequence. In additional aspects, the disclosed implementations may perform process(es) to collect and process transaction data to determine, generate, and analyze transaction affinity data, which may be used to determine transaction affinity relationships. In certain examples, the disclosed implementations may perform recommendation process(es) that analyze transaction affinity relationship data to identify potential merchants for consideration by computing system(s) and/or user(s). Based on such analysis and processing, the disclosed implementations may generate and provide merchant recommendation data that may identify targeted merchant-related systems or locations for consideration by user(s) and/or computing systems.

For example, the disclosed embodiments may include a system for dynamically providing transaction affinity recommendation data that includes first transaction affinity platform computing components that execute software stored in a memory to perform transaction affinity processes to generate and provide transaction affinity recommendation data. In some aspects, the first transaction affinity platform computing components may perform the transaction affinity processes to receive transaction data associated with a set of transactions associated with a first account record and analyze the transaction data to generate a transaction affinity data set. Further, the first transaction affinity platform computing components may perform the transaction affinity processes to identify a first pair of temporally related transactions from the transaction affinity data set. The first pair of temporally related transactions may include a first transaction and a second transaction that occurred later in time from the first transaction. Moreover, the first transaction affinity platform computing components may perform the transaction affinity processes to analyze transaction affinity data associated with each transaction in the first pair of temporally related transactions to determine first time gap data associated with the first transaction and the second transaction, and generate trip transaction data based on the first time gap data. In some examples, transaction affinity relationship data may be generated based on the trip transaction data. Further, the first transaction affinity platform computing components may perform the transaction affinity processes to generate first merchant recommendation data associated with a set of merchants that have an affinity relationship with a target merchant associated at least one transaction in the first pair of temporally related transaction, such that the first merchant recommendation data is generated before a new transaction occurs after the second transaction. The transaction affinity platform computing components consistent with the disclosed embodiments may also perform the transaction affinity processes to provide at least one portion of the first merchant recommendation data to a computing system component that displays content in an interface that includes the at least one portion of the first merchant recommendation data. In some implementations, the at least one portion of the first merchant recommendation data may include target merchant identification data that identifies the target merchant and target merchant promotion data that reflects a promotion offered by the target merchant for one or more items or services offered by the target merchant.

In additional aspects of the disclosed implementations, the first transaction affinity platform computing components may perform the transaction affinity processes to identify pairs of temporally related transactions from the transaction affinity data set, where the temporally related transaction pairs may include the first pair of temporally related transactions. The first transaction affinity platform computing components may also perform the transaction affinity processes to analyze transaction affinity data associated with each transaction in each pair of temporally related transactions to determine time gap data associated with transactions in the respective transaction pair. In other aspects, the first transaction affinity platform computing components may also perform the transaction affinity processes to, for each pair of temporally related transactions, determine whether the time gap data for the temporally related transaction pair meets a temporal parameter, and if the time gap data meets the temporal parameter, identify a merchant pair associated with the temporally related transaction pair, and store merchant transaction information reflecting the identified merchant pair and corresponding time gap data in memory. The disclosed implementation may generate the trip transaction data based on the time gap data included the stored merchant transaction information.

In further aspects, the first transaction affinity platform computing components may also perform the transaction affinity processes to analyze the trip transaction data corresponding to the first pair of temporally related transactions to determine an affinity count value associated with the temporally related transaction pair, and generate the transaction affinity relationship data based on the affinity count value. In some instances, the affinity count value reflects the number of times an account corresponding to the account record was separately used in transactions involving a first merchant associated with the first transaction and a second merchant associated with the second transaction.

In some implementations, second transaction affinity platform computing components may communicate with the first transaction affinity platform computing components to collectively perform the transaction affinity processes consistent with the disclosed implementations. For example, the second transaction affinity platform computing components may be included in a mobile computing system that is connected to a transaction affinity platform system that includes the first transaction affinity platform computing components. In other exemplary configurations, the second transaction affinity platform computing components may be included in a merchant computing system that is connected to a transaction affinity platform system that includes the first transaction affinity platform computing components. The merchant computing system may receive the first merchant recommendation data from the transaction affinity platform system.

Additionally, the disclosed implementations include processes that may be performed by first transaction affinity platform computing components that execute software stored in a memory to perform a transaction affinity method including processes such as receiving transaction data associated with a set of transactions associated with a first account record and analyzing the transaction data to generate a transaction affinity data set. The method may further include identifying a first pair of temporally related transactions from the transaction affinity data set. The first pair of temporally related transactions may include a first transaction and a second transaction that occurred later in time from the first transaction. The method may also further include analyzing transaction affinity data associated with each transaction in the first pair of temporally related transactions to determine first time gap data associated with the first transaction and the second transaction, generating trip transaction data based on the first time gap data, and generating transaction affinity relationship data based on the trip transaction data. In some implementations, the method may also include generating, before a new transaction occurs after the second transaction, first merchant recommendation data associated with a set of merchants that have an affinity relationship with a target merchant associated at least one transaction in the first pair of temporally related transaction.

The above examples are not limiting, as other aspects and configurations of the disclosed implementations are further described below. For example, the disclosed implementations may perform these and other processes that may relate to transactions, such as transactions associated with a financial account (e.g., credit card account, checking account, debit account, line of credit, etc.). In some instances, transactions may occur at brick and mortar locations such as a merchant location (e.g., a store location) that includes one or more computing systems (e.g., point of sale computing devices, local server and/or client computing systems, and the like) that perform processes consistent with the features of the disclosed implementations. In other instances, transactions may occur through electronic communications between computing systems (e.g., online via a network such as the Internet), and thus may involve the electronic purchase of a service or a good remotely.

FIG. 1 is a block diagram of an exemplary system 100 for performing one or more processes consistent with the disclosed implementations. In one implementation, system 100 may include a Transaction Affinity Platform (TAP) 110, one or more clients 120 (exemplary clients 120A and 120B shown), one or more merchants 130 (exemplary merchants 130A and 130B shown), and network 140. The configuration and arrangement of the components in system 100 may vary. For example, system 100 may further include one or more service platform(s) (not shown) that provides information and service(s) for use by other components of system 100 (e.g., transaction affinity platform 110, merchant 130, client 120, etc.). In certain aspects of the disclosed implementations, a component may refer to hardware, firmware, and/or software, or a combination thereof.

In certain aspects, transaction affinity platform 110 may include one or more computing systems arranged and configured to perform one or more processes consistent with the disclosed implementations. For example, transaction affinity platform 110 may include one or more computing systems configured to execute software instructions stored on one or more memory devices to perform one or more processes consistent with one or more of the disclosed features discussed below. In one example, transaction affinity platform 110 may be a system that is associated with an entity (e.g., company, organization, business, and the like) that provides one or more services. For instance, transaction affinity platform 110 may be a system provided by and/or associated with an entity that offers and provides transaction affinity services and/or functionalities to users (e.g., account holders, members, or the like). Alternatively, or in addition, transaction affinity platform 110 may be a system that provides transaction affinity features for one or more users associated with the same entity that may host platform 110 (e.g., employees of the hosting entity). In one non-limiting example, transaction affinity platform 110 may be a system provided by a financial services provider that provides financial services, such as a bank, credit card issuer, financial accounts, or other type of financial service entity that generates, provides, manages, and/or maintains financial service accounts for one or more users. In such implementations, financial service accounts may include, for example, credit card accounts, loan accounts, capital loan accounts, checking accounts, savings accounts, reward accounts, and any other types of financial service accounts known to those skilled in the art. As another example, transaction affinity platform 110 may be a system that is associated with a merchant entity that offers and sells services or items to one or more other entities and/or customers. The disclosed implementations are not limited to the type of entity that may host transaction affinity platform 110 or provide transaction affinity features consistent with the disclosed implementations.

In one aspect, transaction affinity platform 110 may include one or more computing systems that execute software instructions stored on one or more memory devices to perform one or more processes consistent with the disclosed embodiments. For example, transaction affinity platform 110 may include one or more server computing devices that execute software instructions stored in memory to perform one or more processes consistent with the disclosed implementations. In one aspect, the transaction affinity platform 110 server computing device(s) (e.g., TAP computing device(s)) may include one or more memory device(s) storing data and software instructions, and one or more processor(s) programmed and configured to access the data and execute the software instructions to perform processes consistent with the disclosed implementations. The TAP computing device(s) may be standalone, or it may be part of a subsystem, which may be part of a larger system having other computing components that may work collectively to perform one or more processes consistent with the disclosed implementations. For example, transaction affinity platform 110 may include distributed computing device(s) that are remotely located and communicate over a communication link (e.g., a local area network, wide-area network, secured network, public network, combination of secured and public network, etc.). In certain aspects where transaction affinity platform 110 is associated with an entity (hosting entity), the distributed computing device(s) may be distributed across the entity (e.g., computing devices remotely located in different geographic locations associated with the hosting entity). In certain aspects, the configuration and/or programming, and other technical aspects of how transaction affinity platform 110 is arranged may provide efficient and streamlined processing and delivery of information consistent with providing transaction affinity features of the disclosed implementations.

In certain aspects, the TAP computing device(s) may include or may connect to one or more storage devices configured to store data and/or software instructions used by one or more processors to perform one or more processes consistent with disclosed embodiments. For example, the TAP computing device(s) may include memory configured to store one or more software programs that performs functions when executed by one or more processors. The disclosed implementations are not limited to separate programs or computers configured to perform dedicated processes. For example, the TAP computing device(s) may include memory that stores a single program or multiple programs. Additionally, the TAP computing device(s) may execute one or more programs located remotely from the TAP computing device(s) of transaction affinity platform 110. For example, the TAP computing device(s) may access one or more remote programs stored in memory included with a remote component that, when executed, perform one or more processes consistent with the disclosed embodiments. In certain aspects, transaction affinity platform 110 may include (or communicate and interface with) web server software and processing components that generate, maintain, and provide web site(s) that are accessible over network 140. In other aspects. Transaction affinity platform 110 may connect to operate with one or more separate web server(s) or similar computing devices that generate, maintain, and provide web site(s) for use by transaction affinity platform 110 and/or other components of the entity hosting transaction affinity platform 110.

In some implementations, transaction affinity platform 110 may include processing components and/or software executed by one or more processors that provide functionalities for use with mobile computing device consistent with the disclosed implementations. For example, transaction affinity platform 110's TAP computing device(s) may include components that provide data and/or processing instructions, messages, content, etc. to one or more mobile computing devices via, for example, network 140. Examples of such mobile computing devices may include mobile phones, smart phones, personal digital assistants, tablets, laptops, or other types of mobile computing devices known to those or ordinary skill in the art. In certain aspects, the mobile computing devices that operate with the TAP computing device(s) may include one or more processing components and/or software that are configured to provide one or more processes consistent with the disclosed implementations.

In certain aspects, a user may operate, interact with (e.g., provide input, commands, etc.) to one or more components of transaction affinity platform 110 to perform one or more processes consistent with the disclosed implementations. In one aspect, the user may be an employee of, or associated with, the hosting entity (e.g., a person authorized to use one or more components of transaction affinity platform 110). In other implementations, the user may not be an employee of, or otherwise associated with the hosting entity of transaction affinity platform 110. In further aspects, the user may be an employee of, or otherwise associated with, a third-party entity that provides services or items for other users or entities. For example, the user may be an individual who is employed by, or otherwise associated with, an entity that provides transaction affinity services consistent with disclosed implementations that interfaces with and makes use of features provided by transaction affinity platform 110 (e.g., a business entity that offers transaction affinity services that is partnered with or has a relationship with the hosting entity of transaction affinity platform 110). For example, transaction affinity platform 110 may be hosted by a first entity that allows a second entity to access and use the features and functionalities provided by transaction affinity platform 110. For instance, the second entity may be a financial service provider and the first entity may be an entity that provides access to features consistent with those provided by transaction affinity platform 110.

Client 120 (e.g., client 120A and 120B exemplary shown) may be a computing system that connects to other components of system 100 to perform one or more processes consistent with the disclosed implementations. For example, client 120 may be a computing device that is operated by a user to provide, request, and/or receive information from transaction affinity platform 110 or one or more other components, such as merchant 130. While referenced as a client, client 120 is not limited to operating as a client in a typical and known client-server type configuration. For example, in certain implementations, client 120 may be a system that is configured to perform server-type functionalities, such as (for example), receive and process requests for providing and/or processing information or services to other computing components or programs, manage access to a resource (e.g., memory and information stored in the memory), and provide a response to such requests.

In certain aspects, client 120 may include one or more computing devices that perform data processing and electronic communications with components over a communication link, such as network 140. For example, client 120 may include a personal desktop computer, laptop, notebook, tablet, smart phone, or any other device with data processing and electronic communication capabilities that may perform one or more processes consistent with the disclosed implementations. In some aspects, client 120 may be a wired or wireless device such as a Personal Data Assistant (PDA), cellular phone, mobile telephone, computing device connected to a wired communication network (e.g., wired LAN line, etc.) through which a user may provide information (e.g., via an input device).

Client 120 (e.g., client 120A, 120B) may include one or more computing devices that execute software instructions stored in memory to perform one or more processes consistent with the disclosed implementations. For example, client 120 may include one or more memory device(s) storing data and software instructions and one or more processor(s) programmed and arranged to use the data and execute the software instructions to perform processes consistent with the disclosed implementations. Client 120 may be may be standalone, or it may be part of a subsystem, which may be part of a larger system. For example, client 120 may represent a distributed system with processing components that are remotely located and communicate over a network (e.g., network 140). Alternatively, client 120 may be a system including processing components in a housing that perform processes consistent with the disclosed implementations. In certain aspects, client 120 may include one or more computing device(s) that operate as a client or similar computing device that interfaces and operates in connection with other components of system 100, such as transaction affinity platform 110. The type and configuration of client 120 is not limiting to the disclosed implementations. Moreover, in certain aspects, a user may operate client 120 to perform one or more processes consistent with the disclosed implementations. For example, a user may access, use, and otherwise operate client 120 (e.g., client 120A) to perform processes such as, data entry and transmission via network 140 to transaction affinity platform 110 and/or merchant 130. In certain implementations, client 120 may be a mobile computing device that is carried by a user while performing actions and events, such as a smart phone that is carried with a user while performing transactions with one or more merchants.

Merchant 130 (merchant 130A, 130B exemplary shown) may be one or more computing system(s) that perform one or more merchant processes consistent with disclosed implementations. For example, merchant 130 may be a computing system that connects to other components of system 100 to communicate and/or process information in accordance with certain features of the disclosed implementations. Merchant 130 may be associated with an entity that offers and provides services or goods to one or more entities or users. In certain aspects, for example, merchant 130 may be a computing system associated with a brick and mortar merchant location (e.g., a merchant store location with computing devices, infrastructure, etc.) where a user (e.g., a user of client 120) may physically visit to purchase service(s) or good(s). In other aspects, merchant 130 may be a computing system(s) that provides an online portal (e.g., web site, etc.) that provides a mechanism for users to review, request, and purchase service(s) or good(s) via client 120 consistent with disclosed implementations. Thus, in certain aspects, merchant 130 may include one or more web servers that generate, maintain, and manage web site pages that provide interfaces that are accessed by users, via client 120 using browser software (or other software) executing in the computing components of client 120.

In some aspects, merchant 130 may include one or more computing devices that execute software instructions stored in memory to perform one or more processes consistent with the disclosed implementations. In one aspect, the merchant 130 computing device(s) may include one or more memory device(s) storing data and software instructions, and one or more processor(s) programmed and configured to access the data and execute the software instructions to perform one or more processes consistent with the disclosed implementations. The merchant 130 computing device(s) may be standalone, or it may be part of a subsystem, which may be part of a larger system having other computing components that may work collectively to perform one or more processes consistent with the disclosed implementations. For example, merchant 130 may include distributed computing devices that are remotely located and communicate over a communication link (e.g., a local area network, wide-area network, secured network, public network, combination of secured and public network, etc.). For example, the distributed merchant 130 computing devices may be distributed across the entity (e.g., computing devices remotely located in different geographic locations associated with the hosting entity). In certain aspects, the configuration and/or programming, and other technical aspects of how merchant 130 is arranged may provide efficient and streamlined processing and delivery of information consistent with providing transaction affinity features of the disclosed implementations.

In certain aspects, the merchant 130 computing device(s) may include and/or connect to one or more storage devices that store data and/or software instructions used by one or more processors to perform one or more processes consistent with disclosed embodiments. For example, the merchant 130 computing device(s) may include memory that stores one or more software programs that performs functions when executed by one or more processors. The disclosed implementations are not limited to separate programs or computers configured to perform dedicated processes. For example, the merchant 130 computing device(s) may include memory that stores a single program or multiple programs. Additionally, the merchant 130 computing device(s) may execute one or more programs located remotely from the merchant 130 computing device(s). Merchant 130 computing device(s) may access one or more remote programs stored in memory included with a remote component that, when executed, perform one or more processes consistent with the disclosed embodiments. In certain aspects, merchant 130 may include (or communicate and interface with) web server software and processing components that generate, maintain, and provide web site(s) that are accessible over network 140. In other aspects. merchant 130 may connect to operate with one or more separate web server(s) or similar computing devices that generate, maintain, and provide web site(s) for use by merchant 130 and/or other components of the entity hosting merchant 130. In some implementations, merchant 130 may include processing components and/or software executed by one or more processors that provide functionalities for use with a mobile computing device consistent with the disclosed implementations. For example, merchant 130's computing device(s) may include components that provide data and/or processing instructions, messages, content, etc. to one or more mobile computing devices via, for example, network 140. Such mobile computing devices may include mobile phones, smart phones personal digital assistants, tablets, laptops, or other types of mobile computing devices known to those or ordinary skill in the art. In certain aspects, the mobile computing devices that operate with the merchant 130 computing device(s) may include one or more processing components and/or software that provide one or more processes consistent with the disclosed implementations.

In certain aspects, a user may operate one or more components of the hosting entity of merchant 130 to perform one or more one or more processes consistent with the disclosed implementations. In one aspect, the user may be an employee of, or associated with, the hosting entity (e.g., a person authorized to use one or more components of merchant 130). In other implementations, the user may not be an employee of, or is otherwise associated with the hosting entity of merchant 130. In further aspects, the user may be an employee of, or otherwise associated with, a third-party entity that provides services or items for other users or entities. For example, the user may be an individual employed or otherwise associated with an entity that provides transaction affinity services consistent with disclosed implementations that interfaces with and makes use of features provided by merchant 130 (e.g., a business entity that offers transaction affinity services that is partnered with or has a relationship with the hosting entity of merchant 130). For example, in one aspect, merchant 130 may be hosted by a first entity that allows a second entity to access and use the features and functionalities provided by merchant 130. For instance, the second entity may be an entity that provides transaction affinity services and features consistent with those provided by transaction affinity platform 110, and the first entity may be a merchant entity that provides transaction affinity features to user(s) (e.g., customer(s) of the hosting entity of merchant 130), which may be consistent with those provided by transaction affinity platform 110.

The disclosed implementations of system 100 may include different merchants 130 associated with different merchant entities. For example, merchant 130B may be a first merchant entity that provides certain types of service(s) and/or goods (e.g., a home improvement store), and merchant 130A may be a second merchant entity, different from merchant 130B, that provides similar and/or different types of service(s) and/or goods (e.g., a supermarket, a pharmacy, a refueling station, etc.)

Network 140 may be any type of network configured to provide communications between components of system 100. For example, network 100 may be any type of network (including infrastructure) that provides communications, exchanges information, and/or facilitates the exchange of information, such as the Internet, a Local Area Network, or other suitable connection(s) that enables the sending and receiving of information between the components of system 100, and/or combinations of networks (e.g., public network and private networks). In other implementations, one or more components of system 100 may communicate directly through a dedicated communication link(s), such as the exemplary links between transaction affinity platform 110 and client 120A and between transaction affinity platform 110 and merchant 130. Network 140 may include wired or wireless communication paths and infrastructures, or combinations of both. Thus, for example, network 140 may include wireless communication paths and infrastructure and wired communication paths and infrastructure to allow client 120B to wirelessly communicate with another component of system 100 (e.g., merchant 130A). For instance, merchant 130 may include network interface components that connect to portions of network 140 that may facilitate private network and public network communications, protocols, etc. Similar arrangements may apply to other components of system 100 (e.g., transaction affinity platform 110, etc.).

Figure 2:
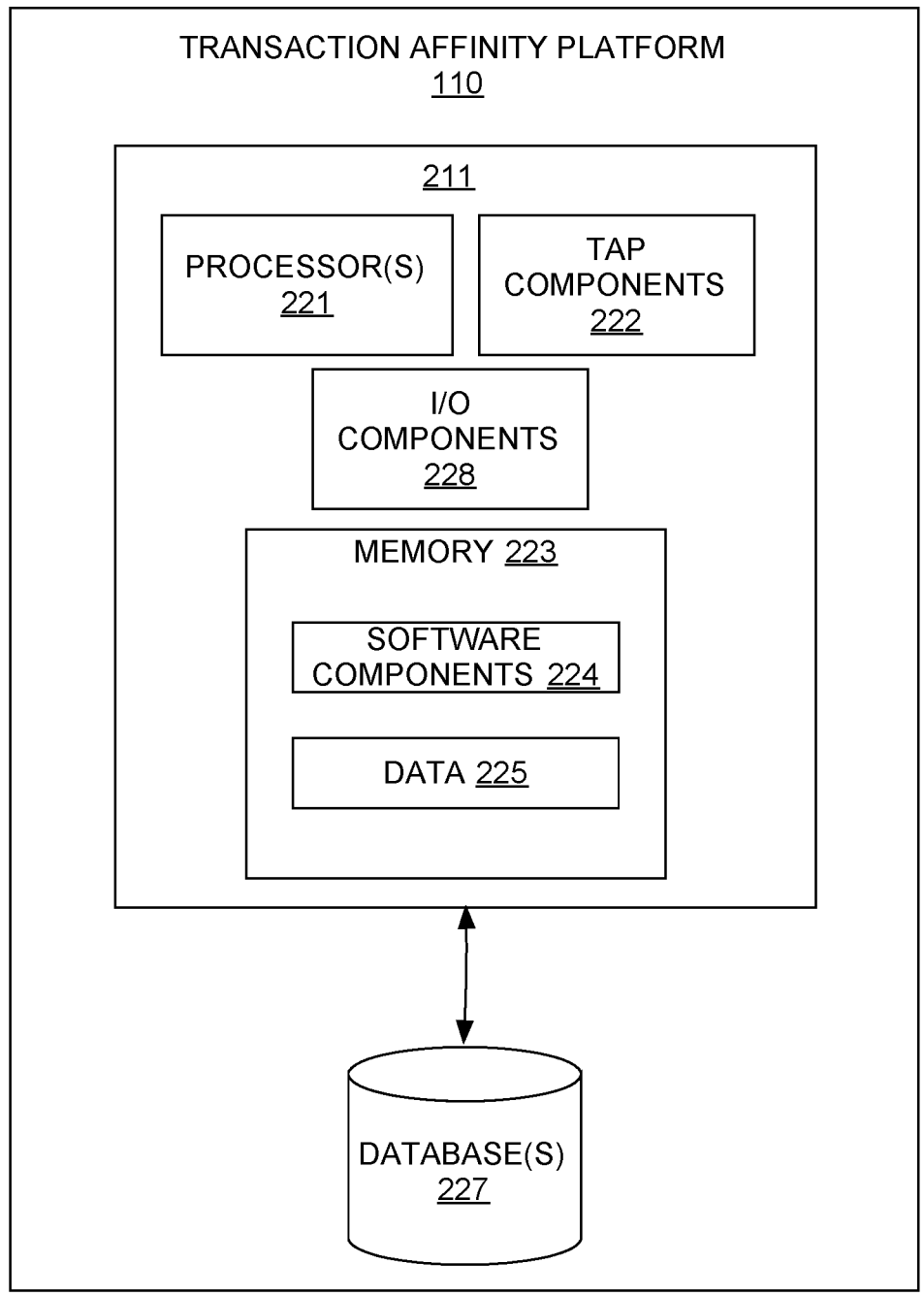
FIG. 2 is a block diagram of an exemplary transaction affinity platform system, consistent with disclosed implementations.

FIG. 2 shows an exemplary transaction affinity platform 110 consistent with disclosed implementations. In one aspect, transaction affinity platform 110 may include a computing system 211 having one or more processors 221, one or more memories 223, one or more Transaction Affinity Platform (TAP) components 222, and one or more input/output (I/O) components 228. Computing system 211 may include components of a computing system not shown that enable computing system 211 to generate, store, process, and receive information in accordance with the disclosed implementations. Computing system 211 may be stand-alone, or it may be part of a subsystem, which may be part of a larger system. Computing system 211 may correspond to the computing device(s) discussed above in connection with FIG. 1 and transaction affinity platform 110 in system 100.

Processor(s) 221 may include one or more processing devices configured to perform one or more processes consistent with disclosed implementations. For example, processor(s) 221 may be programmed processor(s) that are configured to execute software instructions and process data to provide transaction affinity functionalities. In certain aspects, processor(s) 221 may be configured to operate with one or more TAP components 222 to provide one or more processes consistent with the transaction affinity features of the disclosed implementations. The disclosed implementations are not limited to any type of processor(s) configured in computing system 211.

TAP components 222 may include one or more computing components that perform transaction affinity processes consistent with disclosed implementations. For example, TAP components 222 may include software components (e.g., software instructions in a program, collection of interrelated programs, etc.) executed by processor(s) 221 to perform one or more processes consistent with disclosed implementations. In one aspect, software TAP components may be stored in memory 223 as part of software components 224 (disclosed below). In other aspects, software TAP components may be stored in one or more memory device(s) as part of TAP components 222. Moreover, TAP components 222 may include one or more computing TAP components that are configured to provide one or more processes consistent with disclosed implementations. For instance, TAP components 222 may include processing device(s), circuitry, and the like that are configured, programmed, and/or arranged to provide efficient transaction affinity processes and information. For instance, TAP components 222 may include processing device(s) that are arranged and programmed to process transaction affinity data that conserves the use of other resource(s) of transaction affinity platform 110, such as processor(s) 221, memory 224, etc. TAP components 222 may operate independent of, or in conjunction with, other components of computing system 211, such as processor(s) 221, I/O components 228, and memory 223, etc.

Memory 223 may include one or more storage devices that store instructions that may be used by processor(s) 221 and/or TAP components 222 to perform functions related to disclosed implementations. For example, memory 223 may include one or more software instructions, such as software components 224 that may perform one or more processes when executed by processor 221 and/or by processing component(s) of TAP components 222. In certain aspects, memory 223 may include a single program 224 that performs the functions of the computing system 211, or program 224 could comprise multiple programs. Additionally, processor(s) 221 may execute one or more programs located remotely from computing system 211. For example, transaction affinity platform 110, via computing system 211, may access one or more remote programs that, when executed, perform functions related to certain disclosed implementations.

Memory 223 may also store data 225 that may reflect any type of information in one or more formats that transaction affinity platform 110 may use to perform transaction affinity functions. For example, data 225 may include transaction data associated with one or more users of transaction affinity platform 110 (e.g., clients 120A and/or 120B).

I/O components 228 may be one or more devices and related software configured to allow information to be received and/or transmitted by computing system 211. I/O components 228 may include one or more digital and/or analog communication devices that allow computing system 211 to communicate with other components of system 100 (e.g., clients 120A, 120B, merchants 130A, 130B, etc.) and/or components of transaction affinity platform 110.

Computing system 211 may be communicatively connected to one or more database(s) 227. Computing system 211 may be communicatively connected to database(s) 227 through network 140 or may be connected to database(s) 227 via other components (e.g., TAP component(s) 222.) Database(s) 227 may include one or more memory devices that store information and are accessed and/or managed through computing system 211. The databases may include, for example, data and information related to the source and destination of a network request, the data contained in the request, and other aspects consistent with disclosed implementations. Systems and methods consistent with the disclosed implementations, however, are not limited to the use of separate databases 227. In one aspect, transaction affinity platform 110 may include database 227. Alternatively, database 227 may be located remotely from transaction affinity platform 110. Database 227 may include one or more computing components (e.g., database management system, database server(s), etc.) configured to receive and process requests for data stored in memory devices of database(s) 227 and to provide data from database 227. In other aspects, TAP components 222 may include component(s) that provide database management, access, manipulation, and processing of information in database(s) 227 in manners consistent with the disclosed implementations.

Figure 3:
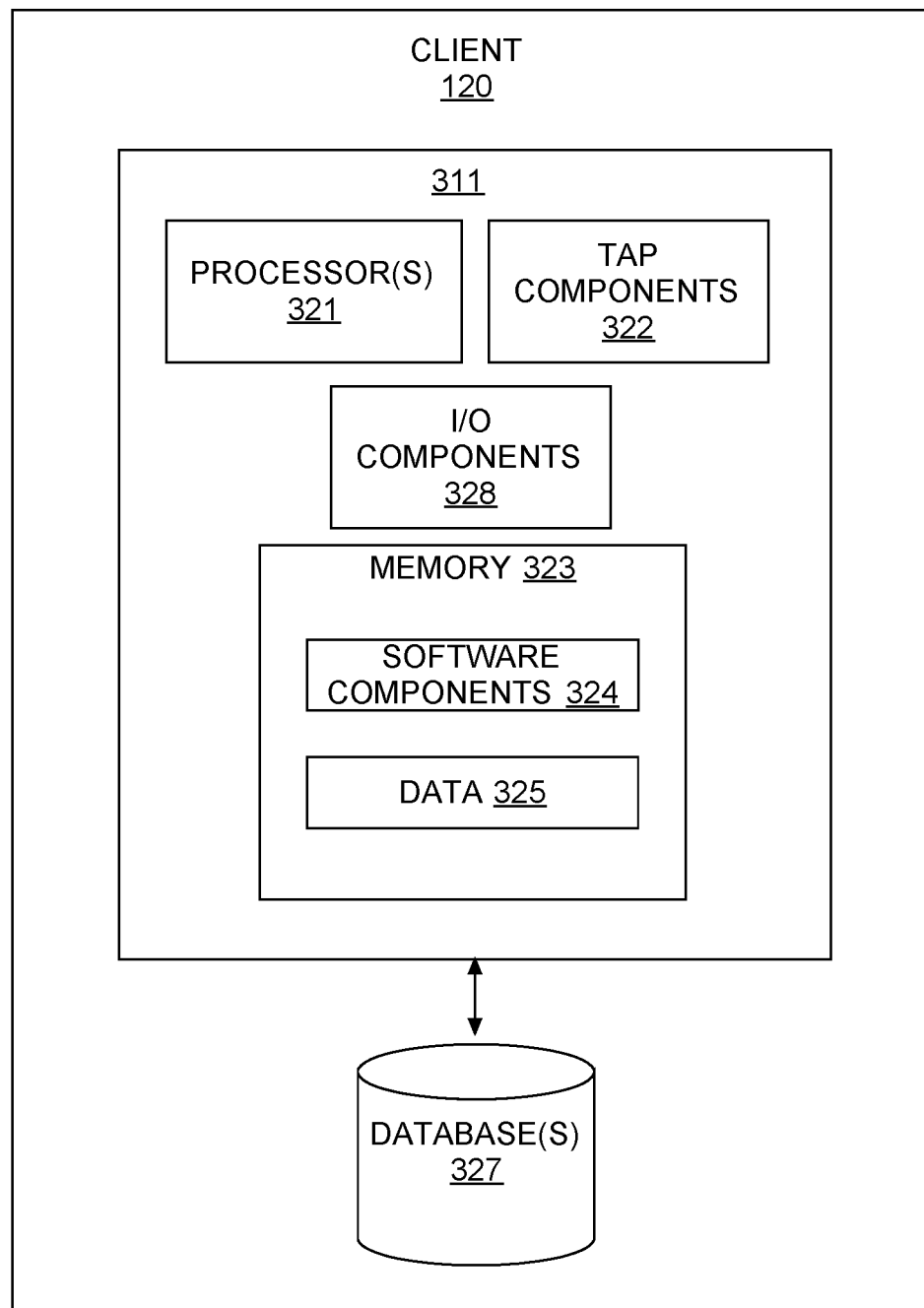
FIG. 3 is a block diagram of an exemplary client system, consistent with disclosed implementations.

FIG. 3 shows an exemplary client 120 (e.g., client 120A or 120B). In one embodiment, client 120 may include a computing system 311 having one or more processors 321, one or more memories 323, one or more TAP components 322, and one or more input/output (I/O) devices 328. Computing system 311 may be standalone, or it may be part of a subsystem, which may be part of a larger system.

Processor(s) 321 may include one or more processing devices that perform one or more processes consistent with disclosed implementations. For example, processor(s) 321 may be programmed processor(s) that execute software instructions and process data to provide transaction affinity functionalities. In certain aspects, processor(s) 321 may operate with one or more TAP components 322 to provide one or more processes consistent with the transaction affinity features of the disclosed implementations. The disclosed implementations are not limited to any type of processor(s) configured in computing system 311.

TAP components 322 may include one or more computing components that perform transaction affinity processes consistent with disclosed implementations. For example, TAP components 322 may include software components (e.g., software instructions in a program, collection of interrelated programs, etc.) executed by processor(s) 321 to perform one or more processes consistent with disclosed implementations. In one aspect, software TAP components 322 may be stored in memory 323 as part of software components 324 (disclosed below). In other aspects, software TAP components 322 may be stored in one or more memory device(s) as part of TAP components 322. Moreover, TAP components 322 may include one or more computing TAP components that are configured to provide one or more processes consistent with disclosed implementations. For instance, TAP components 322 may include (in addition to, or alternative to, software TAP components), processing device(s), circuitry, and the like that are configured, programmed, and/or arranged to provide efficient transaction affinity processes and information. For instance, TAP components 322 may include processing device(s) that are arranged and programmed to process transaction affinity data that conserves the use of other resource(s) of transaction affinity platform 110, such as processor(s) 321, memory 324, etc. TAP components 322 may operate independent of, or in conjunction with, other components of computing system 311, such as processor(s) 321, I/O components 328, and memory 323, etc.

Memory 323 may include one or more storage devices configured to store instructions used by processor 321 to perform functions related to disclosed embodiments. For example, memory 323 may include one or more software instructions, such as software components 324 that may perform one or more processes when executed by processor(s) 321. The disclosed embodiments are not limited to separate programs or computers configured to perform dedicated tasks. For example, memory 323 may include a single program 324 that performs the functions of the computing system 311, or program 324 could comprise multiple programs. Additionally, processor(s) 321 may execute one or more programs located remotely from computing system 311. Memory 323 may also store data 325 that may reflect any type of information in one or more formats that client 120 and/or transaction affinity platform 110 may use to perform transaction affinity functions. For example, data 325 may include transaction data associated with one or more users of client 120.

I/O components 328 may be one or more devices and related software that receives and/or transmits information by/from computing system 311. I/O components 328 may include one or more digital and/or analog communication devices that allow computing system 311 to communicate with other components of system 100 and/or components of client 120. I/O components 328 may include interface components that enable a user of client 120 to input and review information. For example, I/O components 328 may include one or more display device(s) for presenting information to a user, one or more input device(s) (e.g., keyboard, touch screen technologies, mouse input components, etc.) to allow a user of client 120 to input information to computing system 311.

Computing system 311 may be communicatively connected to one or more database(s) 327. Computing system 311 may be communicatively connected to database(s) 327 through network 140 or may be connected to database(s) 327 via other components (e.g., TAP component(s) 322.) Database 327 may include one or more memory devices that store information and are accessed and/or managed through computing system 311. Database 327 may include, for example, data and information related to the source and destination of a network request, the data contained in the request, and other aspects consistent with disclosed implementations. Systems and methods consistent with the disclosed implementations, however, are not limited to the use separate databases 327. In one aspect, client 120 may include database 327. Alternatively, database 327 may be located remotely from client 120. Database 327 may include one or more computing components (e.g., database management system, database server(s), etc.) configured to receive and process requests for data stored in memory devices of database(s) 327 and to provide data from database 327. In other aspects, TAP components 322 may include component(s) that provide database management, access, manipulation, and processing of information in database(s) 327 in manners consistent with the disclosed implementations.

Certain disclosed implementations may operate to allow client 120 to communicate with merchant 130 and transaction affinity platform 110. For example, computing system 110 may perform processes to enable a user of client 120 to interface with merchant 130 to perform one or more transactions (e.g., purchase transactions, or other types of transactions). TAP components 322 may perform one or more transaction affinity processes independent of, or in conjunction with, transaction affinity platform 110 and/or merchant 130. The disclosed implementations thus include, for example, systems, tangible computer-readable mediums, and methods for providing transaction affinity features consistent with those disclosed herein.

For example, in certain aspects, the disclosed implementations may enable client 120 to communicate with merchant 130 to perform a purchase transaction. For instance, merchant 130 may process the transaction for a user of client 120, merchant 130 by requesting information (e.g., account information) associated with the user of client 120, to determine the user's ability to pay the service and/or good associated with the purchase transaction. The disclosed implementations may include methods and systems that allow client 120 to exchange information with merchant 130 that may be used by transaction affinity platform 110 to determine, analyze, generate, approve, process, and manage the purchase transaction, and to subsequently provide transaction affinity features.

Figure 4:
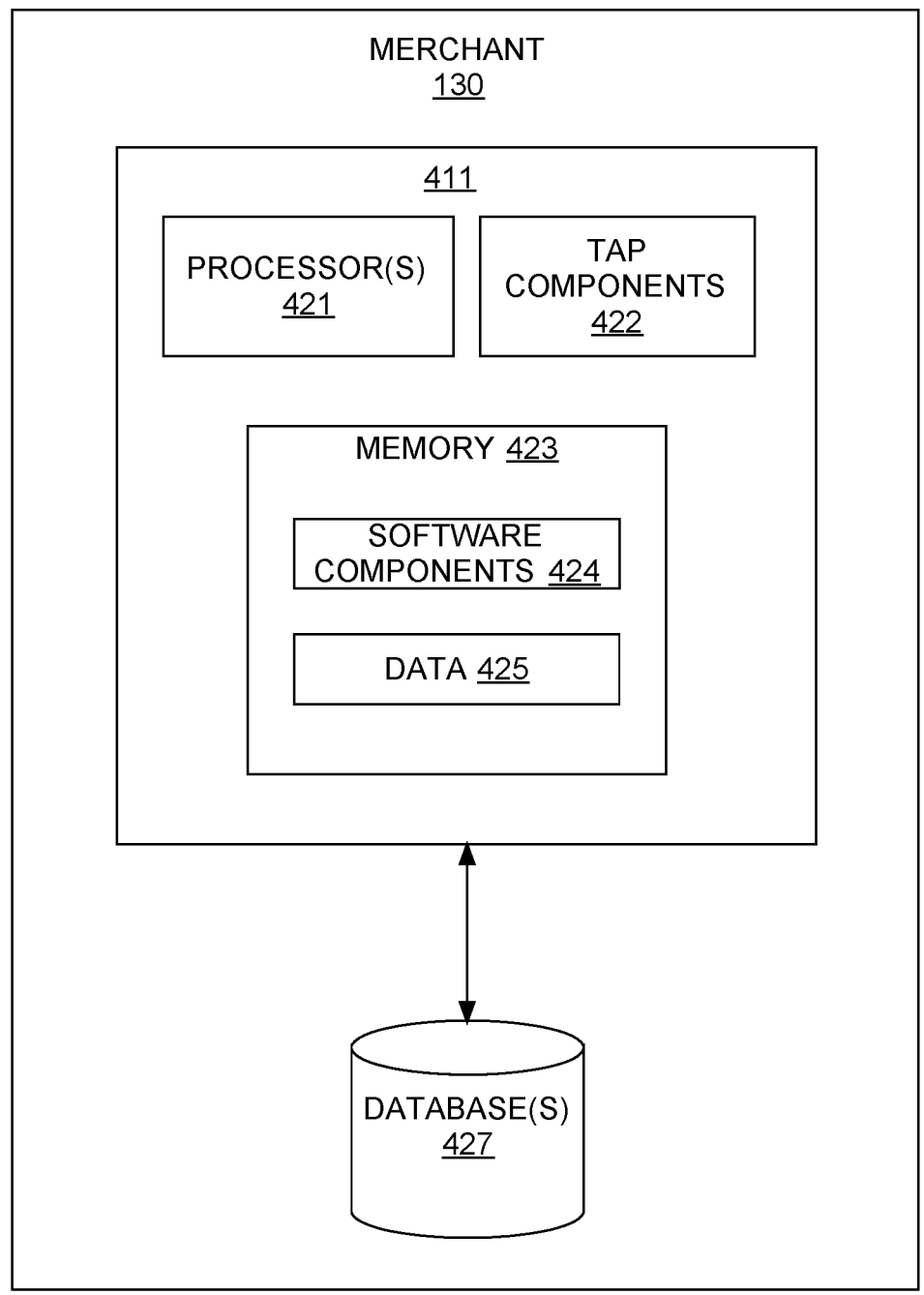
FIG. 4 is a block diagram of an exemplary merchant system, consistent with disclosed implementations.

FIG. 4 shows an exemplary merchant 130 consistent with disclosed implementations. In one aspect, merchant 130 may include a computing system 411 having one or more processors 421, one or more memories 423, one or more Transaction Affinity Platform (TAP) components 422, and one or more input/output (I/O) components (not shown). Computing system 411 may include components of a computing system not shown that enable system 411 to generate, store, process, and receive information in accordance with the disclosed implementations. Computing system 411 may be standalone, or it may be part of a subsystem, which may be part of a larger system.

Processor(s) 421 may include one or more processing devices that perform one or more processes consistent with disclosed implementations. For example, processor(s) 421 may be programmed processor(s) that execute software instructions and process data to provide transaction affinity functionalities. In certain aspects, processor(s) 421 may operate with one or more TAP components 422 to provide one or more processes consistent with the transaction affinity features of the disclosed implementations. The disclosed implementations are not limited to any type of processor(s) configured in computing system 411.

TAP components 422 may include one or more computing components that perform transaction affinity processes consistent with disclosed implementations. For example, TAP components may include software components (e.g., software instructions in a program, collection of inter-related programs, etc.) executed by processor(s) 421 to perform one or more processes consistent with disclosed implementations. In one aspect, software TAP components may be stored in memory 423 as part of software components 424 (disclosed below). In other aspects, software TAP components may be stored in one or more memory device(s) as part of TAP components 422. Moreover, TAP components 422 may include one or more computing TAP components that provide one or more processes consistent with disclosed implementations. For instance, TAP components 422 may include (in addition to, or alternative to, software TAP components), processing device(s), circuitry, and the like that are configured, programmed, and/or arranged to provide efficient transaction affinity processes and information. For instance, TAP components 422 may include processing device(s) that are arranged and programmed to process transaction affinity data that conserves the use of other resource(s) of merchant 130, such as processor(s) 421, memory 424, etc. TAP components 422 may operate independent of, or in conjunction with, other components of computing system 411, such as processor(s) 421, and memory 423, etc.

Memory 423 may include one or more storage devices that store instructions that may be used by processor(s) 421 and/or TAP components 422 to perform functions related to disclosed implementations. For example, memory 423 may be include one or more software instructions, such as program(s) 424 that may perform one or more processes when executed by processor 421 and/or by processing component(s) of TAP components 422. The disclosed embodiments are not limited to separate programs or computers configured to perform dedicated tasks. For example, memory 423 may include a single program 424 that performs the functions of the computing system 411, or program 424 could comprise multiple programs. Additionally, processor(s) 421 may execute one or more programs located remotely from computing system 411. For example, merchant 130, via computing system 411, may access one or more remote programs that, when executed, perform functions related to certain disclosed implementations. Memory 423 may also store data 425 that may reflect any type of information in one or more formats that merchant 130 may use to perform transaction affinity functions. For example, data 425 may include transaction data associated with one or more users of client(s) 120 (e.g., clients 120A and/or 120B).

As part of, or in addition to, the components of computing system 411 (e.g., processor(s) 421, TAP components 422, memory 423, database(s) 427), merchant 130 may include one or more components that perform processes consistent with purchase transactions. For example, merchant 130 may include computing component(s) and/or software component(s) that provide point-of-sale (POS) functionalities. Such POS functionalities may be associated with POS components for brick-and-mortar merchant locations (e.g., a POS used at a checkout of a physical store), or can be associated with online checkout processes and functionalities. Such POS components may perform one or more processes to allow a user of client 120 to initiate, perform, and complete purchase transactions. In certain aspects, the POS components may perform one or more processes consistent with the disclosed implementations.

The I/O components that may be included computing system 411 may be one or more devices and related software configured to allow information to be received and/or transmitted by computing system 411. Such I/O components may include one or more digital and/or analog communication devices that allow computing system 411 to communicate with other components of system 100 and/or components of merchant 130, such as clients 120A, 120B, transaction affinity platform 110, etc.

Computing system 411 may be communicatively connected to one or more database(s) 427. Computing system 411 may be communicatively connected to database(s) 427 through network 140 or may be connected to database(s) 427 via other components (e.g., TAP component(s) 422.) Database 427 may include one or more memory devices that store information and are accessed and/or managed through computing system 411. Database 427 may include, for example, data and information related to the source and destination of a network request, the data contained in the request, and other aspects consistent with disclosed implementations. Systems and methods consistent with the disclosed implementations, however, are not limited to the use of separate databases 427. In one aspect, merchant 130 may include database 427. Alternatively, database 427 may be located remotely from merchant 130. Database 427 may include one or more computing components (e.g., database management system, database server(s), etc.) that receive and process requests for data stored in memory devices of database(s) 427 and to provide data from database 427. In other aspects, TAP components 422 may include component(s) that provide database management, access, manipulation, and processing of information in database(s) 427 in manners consistent with the disclosed implementations.

Figure 5:
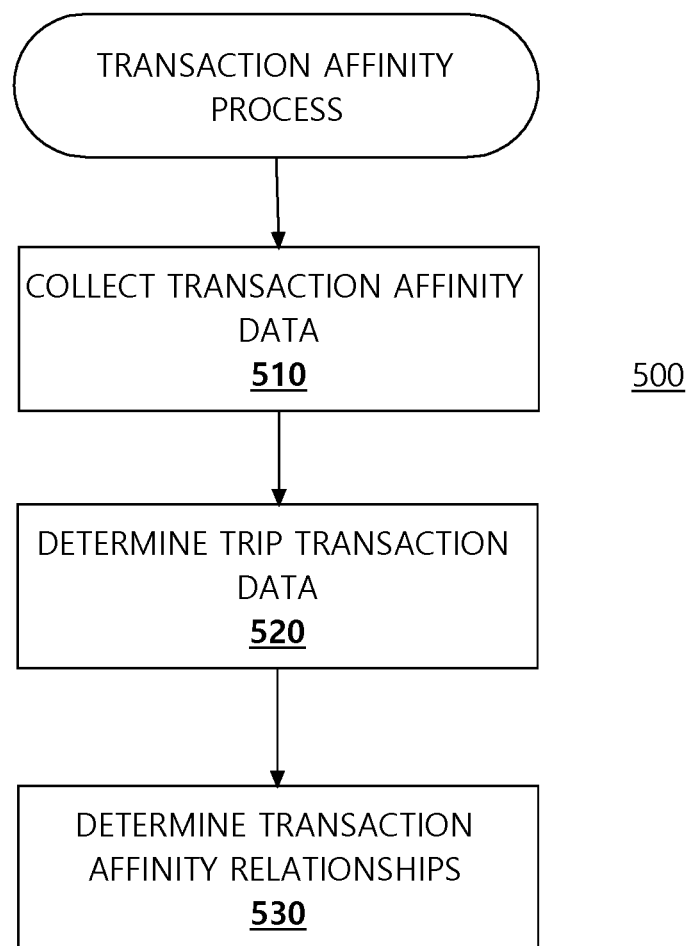
FIG. 5 is a flow chart of an exemplary transaction affinity process, consistent with disclosed implementations.

FIG. 5 is a flow chart of an exemplary transaction affinity process 500 that one or more components of system 100 may perform consistent with certain disclosed implementations. For exemplary purposes only, the description of the features and processes associated with the transaction affinity process of FIG. 5 is described as performed by transaction affinity platform 110. The disclosed implementations, however, are not so limited. For example, client 120 (including e.g., computing system 311) and/or merchant 130 (including e.g., computing system 411) may execute one or more processes associated with transaction affinity process 500. In certain aspects, client 120, merchant 130, and/or transaction affinity platform 110 may individually or collectively perform some or all the processes associated with transaction affinity process 500. In certain implementations, TAP components 222 of transaction affinity platform 110 may perform one or more of the processes of transaction affinity process 500. In addition, or alternatively, TAP components of client 120 and/or merchant 130 (e.g., TAP components 322, 422, respectively) may perform one or more of the processes of transaction affinity process 500. Moreover, the disclosed implementations are not limited to the sequence or number of process steps as shown in FIG. 5.

In certain aspects, transaction affinity platform 110 may initiate transaction affinity process 500. This may occur in response to a request to provide transaction affinity data from a component of system 100, including components included in transaction affinity platform 110. For example, in one aspect, merchant 130 and/or client 120 may generate and send a transaction affinity request over network 140 to transaction affinity platform 110 which causes computing system 211 to perform process 500. In another aspect, transaction affinity platform 110 may receive information, message, etc. from merchant 130 and/or client 120 that identifies one or more transactions associated with stored records for the user of client 120 (e.g., a user account). In another aspect, other computing components of the host entity of transaction affinity platform 110 may receive a request for transaction affinity data and in turn direct transaction affinity platform 110 to perform process 500. Alternatively, transaction affinity platform 110 may be configured to monitor transaction activity of a user of client 120 and automatically perform one or more processes of transaction affinity process 500, consistent with the disclosed implementations.

In one aspect, transaction affinity platform 110 may collect transaction affinity data (Step 510). For example, transaction affinity platform 110 may be configured to monitor activity of an account associated with a user of client 120 (e.g., client 120A). For instance, transaction affinity platform 110 may be associated with a financial service provider that creates, maintains, manages, and processes accounts for many users (e.g., customers). In some instances, the user of client 120A may use client 120A to perform transactions associated with the user's account. Thus, in certain aspects of the disclosed implementations, the user may use client 120A to perform an online purchase transaction using a credit card account provided by a financial service provider. Client 120A may also be used to perform a purchase transaction using the credit card account at a brick and mortar merchant, such as a mobile phone that electronically communicates with a computing system of merchant 130 (e.g., computing system 411 of merchant 130A) to perform the purchase transaction using the credit card account at a physical merchant location. Transaction affinity platform 110 may thus, in certain aspects, access, analyze, and process transaction data associated with a user account to identify and collect transaction affinity data. In certain implementations, the collection of transaction affinity data may include collecting transaction affinity data for multiple user accounts. For example, transaction affinity platform 110 may monitor activity of respective accounts associated with the same user, or different users. For instance, transaction affinity platform 110 may receive, access, or otherwise obtain transaction data associated with a user account of the user associated with client 120A and of a user account associated with client 120B, and identify and collect transaction affinity data associated with the respective user accounts. The discussions below relating to FIG. 6 describe an exemplary transaction affinity data collection process 600 consistent with disclosed implementations.

Transaction affinity platform 110 may also determine trip transaction data (Step 520). For instance, transaction affinity platform 110 may perform processes to determine a temporal relationship between transactions in the collected transition affinity data according to one or more parameters. In one aspect, transaction affinity platform 110 may analyze relationships between transactions associated with a user account (or multiple user accounts). Based on the analysis, transaction affinity platform 110 may determine trip transaction data for use in determining transaction affinity relationships in accordance with disclosed implementations. For example, transaction affinity platform 110 may determine whether the time between a group of transactions is within one or more determined threshold values, and if so, identify a relationship between the transactions. Transaction affinity platform 110 may also analyze the type of merchant associated with the assessed transactions to identify relationships between the transactions. Transaction affinity platform 110 may further analyze other information to identify transaction relationships, such as the date, merchant location (e.g., physical and/or online virtual location (e.g., website address, etc.)), and other information. The descriptions below relating to FIG. 7 explain an exemplary trip transaction data determination process 700 consistent with disclosed implementations.

Transaction affinity process 500 may also include determining transaction affinity relationships (Step 530). For example, in certain aspects, transaction affinity platform 110 may analyze the trip transaction data to determine transaction affinity relationships between transactions for the user account(s) under assessment. In certain aspects, transaction affinity platform 110 may identify and determine the number of times a user account (or multiple accounts for the user) was used in transactions associated with certain merchants included in the trip transaction data. Based on that analysis, transaction affinity platform 110 may determine transaction affinity relationships associated with a set of transactions. In certain aspects, the disclosed implementations involve processing the determined transaction affinity relationship information to provide information for presentation to a user of client 120, to merchant 130, or to other components of system 100. In other aspects, the determined transaction affinity relationship information may be used to perform additional processes consistent with the disclosed implementations. The discussions below relating to FIG. 8 describe an exemplary transaction affinity relationships determination process 800 consistent with disclosed implementations.

Figure 6:
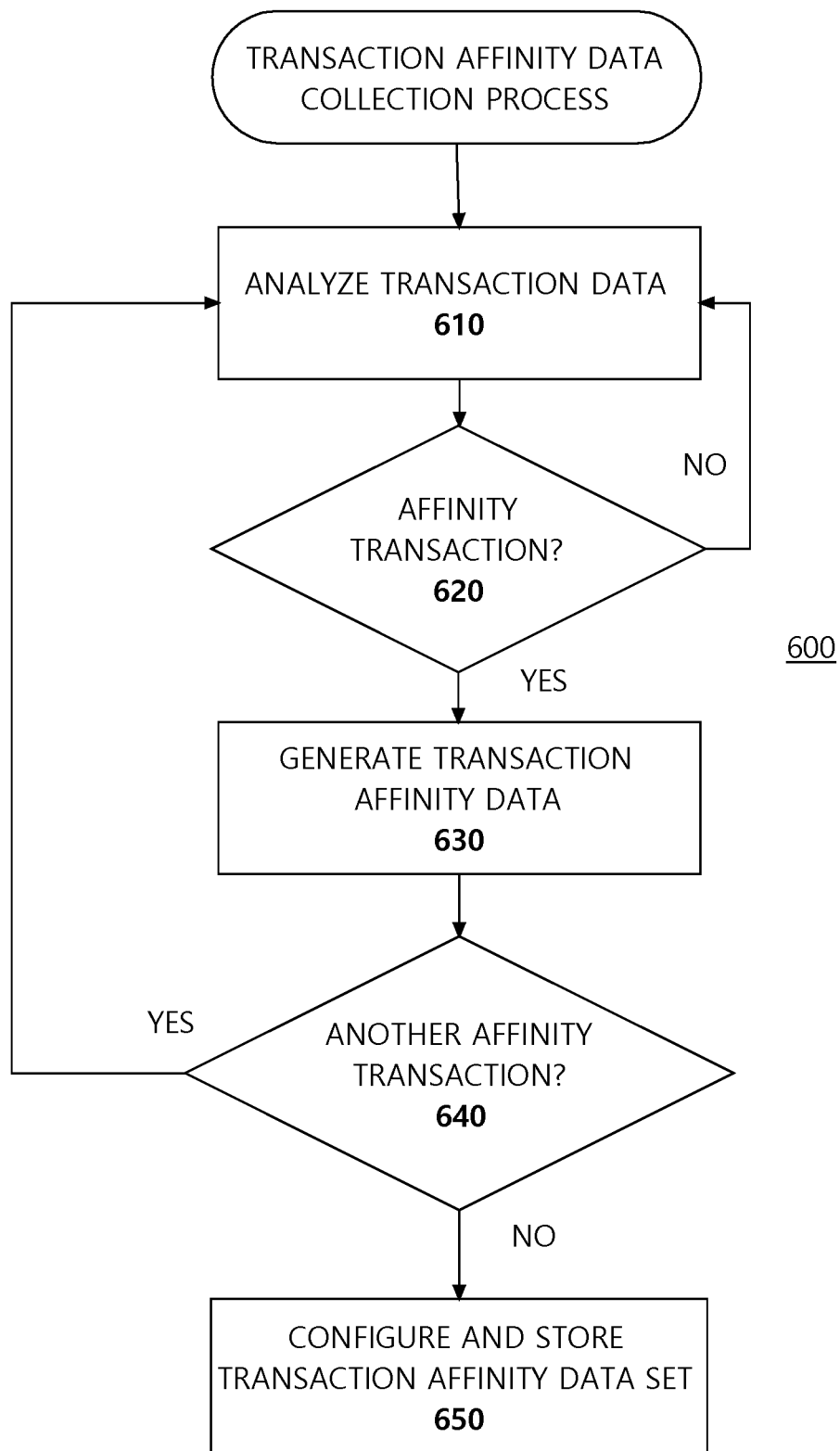
FIG. 6 is a flow chart of an exemplary transaction affinity data collection process, consistent with disclosed implementations.

FIG. 6 is a flow chart of a transaction affinity data collection process 600 that one or more components of system 100 may perform consistent with certain disclosed implementations. For exemplary purposes, the description of the features and processes associated with the transaction affinity data collection process 600 of FIG. 6 is described below as being performed by transaction affinity platform 110. The disclosed implementations, however, are not so limited. For example, client 120 (including e.g., computing system 311) and/or merchant 130 (including e.g., computing system 411) may execute software to perform one or more processes associated with transaction affinity data collection process 600. In certain aspects, client 120, merchant 130, and/or transaction affinity platform 110 may individually or collectively perform some or all the processes associated with transaction affinity data collection process 600. In certain implementations, TAP components 222 of transaction affinity platform 110 may perform one or more of the processes of transaction affinity data collection process 600. In addition, or alternatively, TAP components of client 120 and/or merchant 130 (e.g., TAP components 322, 422, respectively) may perform one or more of the processes of transaction affinity data collection process 600. Moreover, the disclosed implementations are not limited to the sequence and/or number of process steps shown in FIG. 6.

In one aspect, transaction affinity data collection process 600 may include analyzing transaction data (Step 610). In certain implementations, TAP components 222 may request transaction data associated with a user account that has been collected by transaction affinity platform 110 or components of the host entity of transaction affinity platform 110. For instance, TAP components 222 may include software components executed by computing components that request access to and/or receive transaction data associated with a user of client 120, such as a user account.

For example, a user of client 120A may have one or more financial accounts provided by an account provider, such as a financial service provider that provides one or more accounts to one or more users that can be used to perform one or more transactions (e.g., purchase transactions, etc.). In one aspect, the account provider may be the host of transaction affinity platform 110. In other aspects, the account provider may not host or otherwise provide transaction affinity platform 110. In either case, the user may operate and interact with client 120A to perform a purchase transaction using a first user account provided by the account provider. As an example, the user of client 120A may visit a merchant location associated with merchant 130A to purchase one or more items. During check out, the user may present an instrument (e.g., credit card, etc.) associated with the user account to purchase the items using a POS device provided by the merchant, which may be associated with merchant 130A. The POS device may facilitate the purchase transaction to perform known purchase transaction processes. For instance, merchant 130A may be include software and computing components that perform known purchase transaction processes, including communicating with verification network components and a financial service account provider to authorize the purchase transaction. Once the purchase transaction is completed, merchant 130A, or a component associated with the merchant, may provide transaction data associated with the user's purchase transaction with the user account. The transaction data may include information such as time stamp data (e.g., date, time), account number data, merchant data (e.g., location, identifier, etc.), and other known transaction information. The account provider may receive and store the transaction data in memory (e.g., a database) that maintains transaction information for user accounts. In one implementation, the account provider may include computing components that perform transaction data processing, storing, and management. In other implementations, transaction affinity platform 110 may include components (e.g., TAP components 222) that request and receive the transaction data for a user account (or multiple user accounts). Alternatively, the account provider computing components may automatically push the transaction data to memory that is accessible by transaction affinity platform 110, such as database 127 and/or memory 123.

In some aspects, TAP components 222 may include software components that are executed by one or more processors (e.g., processors 221 or computing components of TAP components 222) that request and receive transaction data associated with one or more user accounts. For example, database 227 may store transaction data for transactions associated with a user account. TAP components 222 may be configured to perform one or more aspects of process 600 in response to a notification that transaction data has been received and stored in database 227. Alternatively, TAP components may be configured to perform one or more aspects of process 600 in response to a notification that is provided after a predetermined period of time, or after a predetermined number of transactions associated with the user account have been stored (or added) to database 227.

Once transaction data is available (e.g., stored in database 227), TAP components 222 may analyze transaction data for a transaction (Step 610) to determine whether the transaction is an affinity transaction (Step 620). An affinity transaction is a transaction that is to be considered for transaction affinity processing in accordance with the disclosed implementations. In one aspect, affinity transaction platform 110 may determine whether one or more transactions of a user account qualify for affinity transaction processing. For instance, the account provider of the user account may provide an option to the user of client 120A (e.g., the account holder) whether they wish to receive transaction affinity services. If so, transaction affinity platform 110 may maintain data in a user account profile that identifies the user's account as one eligible for transaction affinity processing. In other implementations, transaction affinity platform 110 may automatically identify all transaction of the user's account as qualifying affinity transactions for processing. In such instances, process 600 may be configured to skip such analysis and step 620. In other aspects, transaction affinity platform 110 may be configured to execute processes that identify transactions associated with the user's account as affinity transactions based on one or more parameters, which may be stored in the user account profile. For example, transaction affinity platform 110 may perform processes that identify user account transactions based on a temporal parameter (e.g., only identify transactions for processing based on certain dates, date ranges, time of day, time of day ranges, etc.).

Once a selected transaction is identified as an affinity transaction (Step 620, Yes; or automatically identified as an affinity transaction as discussed above), TAP components 222 may generate transaction affinity data (Step 630). In one implementation, TAP components 222 may generate transaction affinity data by parsing the transaction data of the current transaction under analysis to collect data used by the transaction affinity processes consistent with the disclosed implementations. For example, TAP components may execute processes that extracts data and generates affinity data from the transaction record, such as time stamp information (date, time of transaction), account identification data, amount of transaction (e.g., if a purchase transaction), merchant identification data, merchant location information, etc. In some instances, TAP components 222 may generate affinity data based on information in the transaction data. For example, TAP components 222 may execute processes that determines a merchant category based on the merchant identifier and/or merchant location information obtained from the transaction data. In one aspect, transaction affinity platform 110 may maintain, or have access to, a data structure stored in memory of merchant category information that identifies one or more categories for merchants. A merchant category may be an identifier (textual, numeric, alpha-numeric, etc.) that is associated with an industry, product, retailer industry, service, etc. For instance, a first merchant category may be associated with home improvement goods/services, a second merchant category may be associated with grocery retailers, a third merchant category may be associated with vehicle repair, a fourth merchant category may be associated with air travel services, a fifth merchant category may be associated with lodging services, etc. The type of merchant category is not limited to the above examples, which are provided for exemplary purposes only.

In certain implementations, TAP components 222 may access the data structure to collect the merchant category data for the merchant included in the transaction data under analysis. The merchant category data may be generated by transaction affinity platform 110, by other component(s) of the host entity (e.g., account provider) of platform 110, or be provided by the merchant. Thus, in one aspect, transaction affinity platform 110 may access a merchant category table that identifies certain categories for one or more merchants (e.g., merchants associated with merchant 130A, 130B). Based on the information, TAP components 222 may add the merchant category data to the set of transaction affinity data for the transaction under analysis.

In other embodiments, other affinity data may be generated by TAP components 222. For example, if the transaction data for the transaction under analysis does not provide the merchant location information (e.g., if the purchase transaction was an online transaction, and the web site address associated with the merchant is unknown), TAP components 222 may execute software components that perform processes for obtaining the web site address of the merchant involved with the purchase transaction. In one aspect, TAP components 222 may parse the transaction data to obtain the identifier and name of the merchant, and check a data structure of stored web site address information mapped to merchant identifiers and/or names. The merchant web site address data structure may be stored in memory 223, database 227, or may be provided by components external to transaction affinity platform 110, such as a third-party provider of such information accessible over network 140.

Once the transaction affinity data is generated for a given transaction, TAP components 222 may store the transaction affinity data in memory (e.g., memory 223, database 127, and/or another storage device located within or external to transaction affinity platform 110). TAP components 222 may perform one or more processes that determine whether another transaction is available for analysis (Step 640), and if so (Step 640; YES), process 600 may continue to process Step 610 to analyze the transaction data for the next user account transaction in a manner consistent with the disclosed embodiments. If, however, no more transactions are available for analysis (Step 640; NO), TAP components 222 may configure and store a transaction affinity data set in memory (Step 650).

Figure 7:
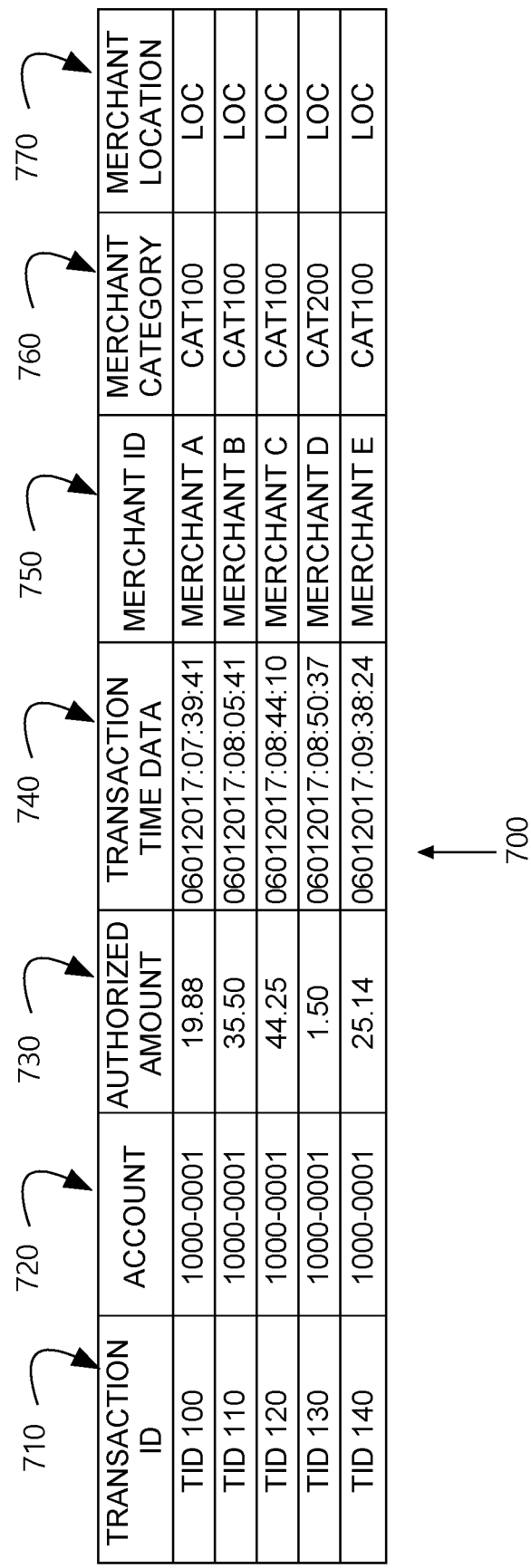
FIG. 7 is a block diagram of exemplary transaction affinity data, consistent with disclosed implementations.

FIG. 7 shows a block diagram of a non-limiting exemplary set of transaction affinity data 700 for a user account consistent with disclosed implementations. As shown, the set of transaction affinity data 700 may include one or more data fields including transaction data for each transaction in a set of transactions analyzed by TAP components 222 as discussed above. While transaction affinity data set 700 shows five transactions, the disclosed implementations are not limited to the number of transactions that may be included in the set. For example, depending on one or more parameters that may control what transactions are collected and stored, and on one or more parameters that may control what transaction affinity data is collected from the transaction data, the number and type of information maintained in transaction affinity data set 700 may vary. In some aspects, the data fields may include a transaction identifier (ID) field 710, an account identifier field 720, a transaction amount field 730, a transaction time field 740, a merchant identifier field 750, a merchant category field 760, and a merchant location field 770. In some implementations, transaction identifier field 710 may be a unique identifier assigned to each transaction in the transaction affinity data set 700. Account identifier field 720 may include data identifying the account used in the transaction, such as an account number or other information identifying the account used in the transaction. Amount field 730 may include a purchase amount of the transaction (if the transaction is a purchase transaction). Transaction time field 740 may include time data reflecting when the transaction occurred (e.g., time and/or date data, etc.). Merchant identifier field 750 may include an identifier for the merchant involved in the transaction. Merchant category field 760 may be the merchant category identifier determined by TAP components 222 as discussed above. Merchant location field 770 may include location data associated with the merchant involved in the transaction and identified in merchant identifier field 760. As discussed above, where the transaction was an online transaction, merchant location field may reflect a web site address (or other location identifying information) for a merchant web site (or other network location) where goods and/or services may be purchased.

The disclosed implementations are not limited to the arrangement of fields, or the specific types of data included in the transaction affinity data set (e.g., set 700). For instance, the generated transaction affinity data set may include additional information not discussed above or shown in FIG. 7. Moreover, some data described above may not be included in the transaction affinity data set. Further, data included in one or more fields of the transaction affinity data set may be combined. For instance, merchant ID field 750 and merchant location field 770 may be combined into a single set of data that includes information identifying the merchant and the location of the merchant. The format of transaction affinity data set 700 shown in FIG. 7 is not limiting to the disclosed implementations. The configuration of data set 700 may vary and may be configured to promote efficient access and processing of transaction affinity data collected in process 600. Also, while the above description discusses generating a transaction affinity data set for a single user account, the disclosed implementations are not limited to such. For example, TAP components 222 may be configured to perform process 600 for transaction data associated with different accounts used in different transactions. Therefore, TAP components 222 may generate a transaction affinity data set that includes transactions for different accounts, which may or may not be associated with the same user. Thus, in some aspects, account identifier field 720 may identify different accounts for different transactions (e.g., transaction identifier field 710).

Figure 8:
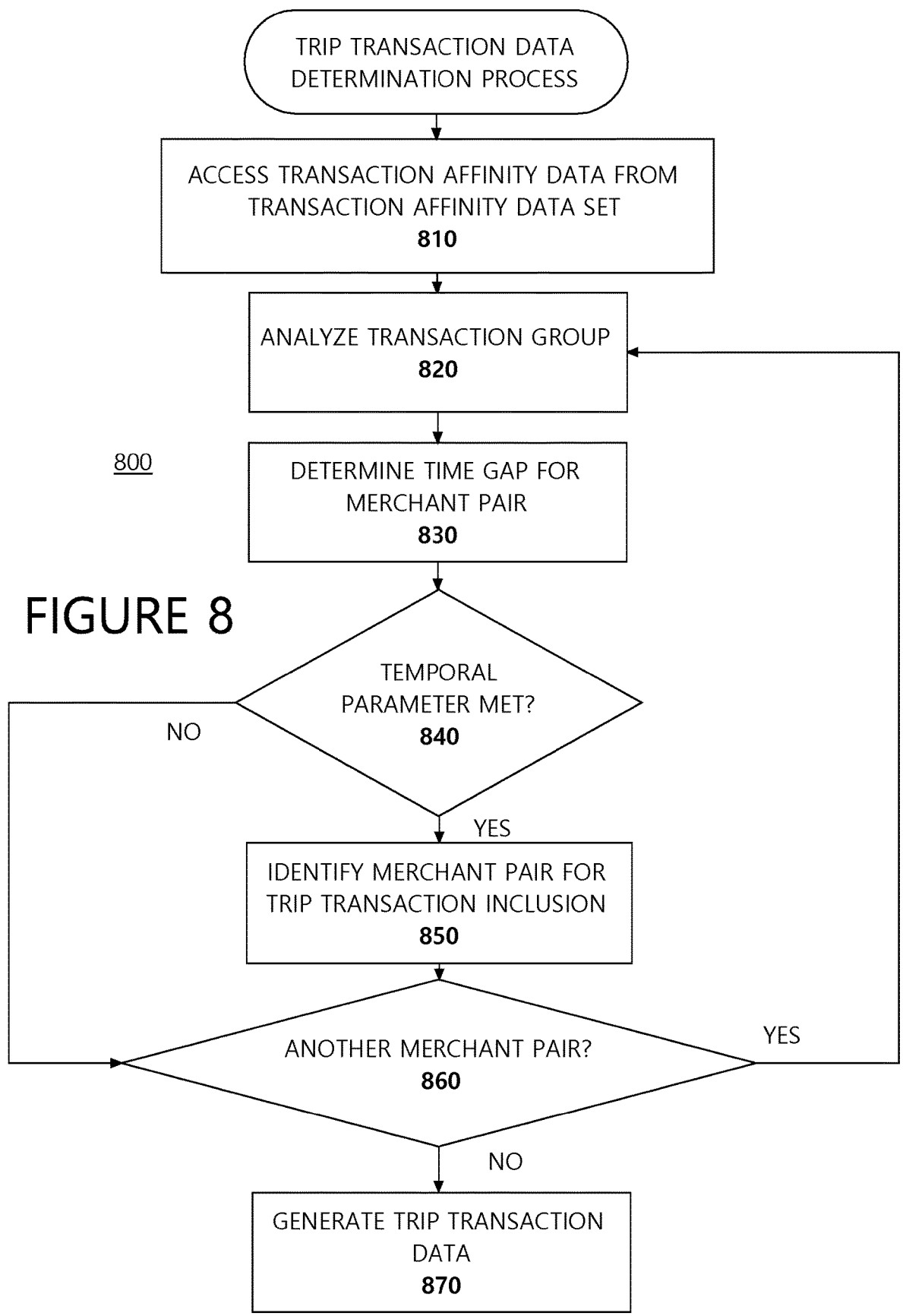
FIG. 8 is a flow chart of an exemplary trip transaction data determination process, consistent with disclosed implementations.

FIG. 8 is a flow chart of a trip transaction determination process 800 that one or more components of system 100 may perform consistent with certain disclosed implementations. For exemplary purposes only, the description of the features and processes associated with the trip transaction determination process 800 of FIG. 8 is described below as being performed by transaction affinity platform 110. The disclosed implementations, however, are not so limited. For example, client 120 (including e.g., computing system 311) and/or merchant 130 (including e.g., computing system 411) may execute software that performs one or more processes associated with trip transaction determination process 800. In certain aspects, client 120, merchant 130, and/or transaction affinity platform 110 may individually or collectively perform some or all the processes associated with trip transaction determination process 800. In certain implementations, TAP components 222 of transaction affinity platform 110 may perform one or more of the processes of trip transaction determination process 800. In addition, or alternatively, TAP components of client 120 and/or merchant 130 (e.g., TAP components 322, 422, respectively) may perform one or more of the processes of trip transaction determination process 800. Moreover, the disclosed implementations are not limited to the sequence and/or number of process steps shown in FIG. 8.

In certain implementations, TAP components 222, for example, may perform processes that access a target transaction affinity data set, such as the data set that may have been generated by transaction affinity data collection process 600 (Step 810). In some aspects, TAP components 222 may access the memory storing the transaction affinity data set (e.g., memory 223, database 227, etc.), or may generate and provide a request to another component to provide the requested target transaction affinity data set. For example, in some implementations, TAP components 222 may perform one or more processes that determine the type of transaction affinity data set to access or receive, such as a transaction affinity data set associated with one or more identified accounts (e.g., a first user account, a first and second account associated with the same user, a first user account and a second user account associated with a second user, a range of accounts, etc.). Based on that determination, TAP components 222 may generate and provide a request to another component software and/or computing component of transaction affinity platform 110 to request, access, retrieve, and provide the requested transaction affinity data set. In other aspects, the disclosed implementations may not perform process(es) that determine the type of transaction affinity data set transaction affinity platform 110, but rather TAP components 22 may request and/or access and receive a transaction affinity data set based on the data set that was previously generated and/or updated.

TAP components 222 may analyze the target transaction affinity data set to identify and analyze a group of transactions in the data set (Step 820). In one aspect, TAP components 222 may identify two temporally related transactions (e.g., a first transaction and a following second transaction) as a transaction pair to analyze. TAP components 222 may perform process(es) that analyze the transaction identifier field (e.g., field 710), time data (e.g., transaction time data field 740), merchant identifier (e.g., field 750), or other information in the transaction data to identify the transaction pair. Once identified, TAP components 222 may determine whether the transactions in the transaction pair involved the same or different merchants by checking, for example, the merchant identifier data included in the transaction affinity data set for each of the two transactions in the transaction pair. For example, TAP components 222 may determine that two subsequent transactions are associated with the same merchant (e.g., if a user of an account performed transactions at the same merchant location at different sequential times). Alternatively, TAP components 222 may determine that the two subsequent transactions are associated with different merchants. In some aspects, TAP components 222 may disregard the transaction pair for performing trip transaction data determination process 800. In other aspects, TAP components 222 may proceed to perform the processes of trip transaction data determination process 800 even when the same merchant is identified with the two sequential transactions.

At step 830, TAP components 222 may perform process(es) that analyze the time data for each transaction to determine a time gap for a merchant pair associated with the transactions in the transaction pair under analysis (Step 830). For example, in certain implementations, at step 830, TAP components 222 may perform a process that compares the time data for the first and second transactions in the transaction pair. Based on the analysis, TAP components 222 may determine an amount of time between the first transaction and the second transaction and generate a time gap value for the merchant pair involved in those transactions. The time gap value may reflect a time in seconds, minutes, or other temporal value. For example, referring to FIG. 7, TAP components 222 may determine that transaction TID 100 and transaction TID 110 are transactions in a transaction pair. By comparing the time data (e.g., time data field 740) for each transaction, TAP components 222 may determine that transaction TID 110 occurred twenty-six (26) minutes after transaction TID 100. TAP components 222 may be configured to perform rounding process(es) on the comparison result to generate the time gap data for transaction pair. Based on the comparison, TAP components 222 may generate time gap data for the merchant pair involved in those transaction (e.g., Merchant A and Merchant B) to be a value reflecting the time difference. TAP components 222 may store a time gap record for the merchant pair in the transaction pair analyzed in memory. For example, TAP components 222 may perform one or more processes that generate and store the time gap record in memory 223, database 227, and/or another memory devices accessible by components of transaction affinity platform 110, including TAP components 222.

Based on the time gap for the merchant pair, TAP components 222 may perform one or more processes to determine whether the time gap value for the merchant pair under analysis meets a determined threshold (Step 840). For example, TAP components 222 may store a temporal threshold value and reflects a time value (e.g., N seconds, N minutes, N hours, N days, etc.; where N may be at least 1), that may be used to determine whether a time gap value qualifies a merchant pair and corresponding transaction pair to be included in the trip transaction data generated by process 800.

In some aspects, transaction affinity platform 110 may perform one or more processes that provide a user (e.g., user of client 120A or 120B, etc.) with an option to set the temporal threshold value. For example, transaction affinity platform 110 (or a component of the hosting entity of transaction affinity platform 110) may perform process(es) that allow a user who is an account holder to select or request to receive transaction affinity services associated with the account. Further, transaction affinity platform 110 (or a component of the hosting entity of transaction affinity platform 110) may perform process(es) that allow a transaction affinity platform account user to configure one or more settings relating to transaction affinity services. As an example, one of the settings may be a setting that defines the temporal threshold value that is used to determine whether one or more transaction pairs will be used in transaction affinity relationship processing. For example, TAP components 222 may perform process(es) that does not include two or more transactions that occurred over 8 hours of each other, etc. Based on the user's selection, client 120 may provide data reflecting the selection to transaction affinity platform 110, which may perform process(es) that may generate information in a memory that identifies the user account as a transaction affinity account and stores the temporal threshold value defined by the user.

In other aspects, transaction affinity platform 110 may perform one or more processes that automatically set the temporal threshold value based on software components executed by transaction affinity platform 110. For instance, TAP components 222 may automatically set the temporal threshold value, based on, for example, the user account that is under analysis. In some instances, TAP components 222 may perform process(es) that dynamically adjust the temporal threshold value. For example, TAP components 222 may access and analyze previous time gap data that was determined and stored in memory relating to the identified merchants in the merchant pair. Based on that analysis, TAP components 222 may dynamically set the temporal threshold value to reflect previously determined time gaps that may have been used in previous transaction affinity processes consistent with those disclosed herein. In other aspects, TAP components 222 may perform process(es) that dynamically set the temporal threshold value based on merchant density. For example, in certain disclosed implementations, TAP components 222 may analyze merchant information to determine the geographical distance between merchants based on location data. For instance, the distance between merchants in rural areas may be larger than the distance between merchants in urban areas. Thus, users carrying respective clients 120 may typically drive between merchants in rural areas, where users in urban areas may walk. Thus, in certain aspects, TAP components 222 may perform process(es) that access and analyze merchant location information, which may include predetermined location category information (e.g., urban, rural, etc.) to determine whether transactions associated with identified merchants took place at particular merchant locations (e.g., rural or urban). Based on that analysis, TAP components 222 may dynamically set the temporal threshold value to adjust for different time variances that may occur in such areas. For example, TAP components 222 may determine that the transactions between a merchant pair relate to a location where more time should be allotted between merchant transactions (e.g., rural location, suburban location, etc.), TAP components 222 may increase or set a higher temporal threshold value (e.g., 1 hour, 2 hours, etc.). If TAP components 222 determines that the time gap for a merchant pair meets the temporal parameter (e.g., the temporal threshold value) (Step 840; YES) (e.g., the time gap for the merchant pair is below a temporal threshold value of 1 hour), TAP components 222 may perform process(es) that may identify the merchant pair for inclusion in the trip transaction data (Step 850). In one aspect, TAP components 222 may store the merchant pair and time gap information in a data structure in memory that is accessible and used for trip transaction data generation. In other aspects, TAP components 222 may generate information that reflects that the merchant pair is to be used in generating trip transaction data for the transaction affinity process. If, however, TAP components 222 determines that the time gap for a merchant pair does not meet the temporal parameter (e.g., the temporal threshold value) (Step 840; NO) (e.g., the time gap for the merchant pair is above a temporal threshold value of 1 hour), process 800 may continue to Step 860.

At Step 860, TAP components 222 may determine whether another merchant/transaction pair is to be analyzed by process 800, and if so (Step 860; YES), the process returns to Step 820 to analyze another transaction pair in the transaction group in a manner consistent with the processes described above. If, however, there are no more merchant pairs to analyze (Step 860; NO), TAP components 222 may perform one or more processes to generate trip transaction data (Step 870).

TAP components 222 may generate trip transaction data in different, non-limiting ways. For example, in one aspect, TAP components 222 may perform one or more processes that identify the merchant pairs identified for trip transaction inclusion (Step 850), and generate and store in a data structure a trip transaction data set including merchant information and associated time gap values for the identified merchant pairs. FIG. 9 shows a block diagram of non-limiting exemplary trip transaction data 900 for analyzed merchant pairs consistent with disclosed implementations. As shown, the trip transaction data 900 may include one or more data fields including data associated with the transaction pairs analyzed during the trip transaction determination process 800 as discussed above. For instance, as exemplified in FIG. 9, trip transaction data 900 may include merchant pair records 910 that each include merchant identifiers for a first merchant 920 and a second merchant 930, and the determined time gap value 940 for the merchant pair. As shown, the first merchant pair record may include the merchant identifier (Merchant M1) for the merchant associated with a first transaction in an analyzed transaction pair, and the second merchant identifier (Merchant M2) in the second transaction of the analyzed transaction pair, and the corresponding time gap value (5 minutes), which reflects the time difference between the first transaction and the second transaction. While trip transaction data 900 includes five merchant pairs, the disclosed implementations are not limited to the number of merchant pairs as shown in FIG. 9. Moreover, the format and information included in trip transaction data consistent with disclosed embodiments is not limited to the configuration shown in FIG. 9. Other information, or other types of information, may be included in the trip transaction data generated by the disclosed implementations.

Figure 10:
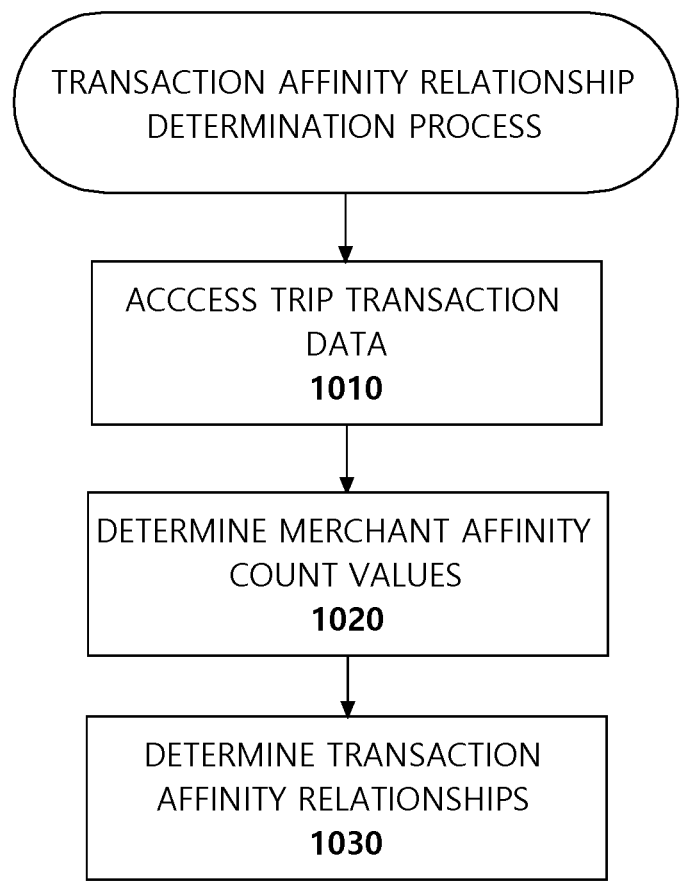
FIG. 10 is a flow chart of an exemplary transaction affinity relationship determination process, consistent with disclosed implementations.

FIG. 10 is a flow chart of a transaction affinity relationship determination process 1000 that one or more components of system 100 may perform consistent with certain disclosed implementations. For exemplary purposes only, the description of the features and processes associated with the transaction affinity relationship determination process 1000 of FIG. 10 is described below as being performed by transaction affinity platform 110. The disclosed implementations, however, are not so limited. For example, client 120 (including e.g., computing system 311) and/or merchant 130 (including e.g., computing system 411) may perform one or more processes associated with transaction affinity relationship determination process 1000. In certain aspects, client 120, merchant 130, and/or transaction affinity platform 110 may individually or collectively perform some or all the processes associated with transaction affinity relationship determination process 1000. In certain implementations, TAP components 222 of transaction affinity platform 110 may perform one or more of the processes of transaction affinity relationship determination process 1000. In addition, or alternatively, TAP components of client 120 and/or merchant 130 (e.g., TAP components 322, 422, respectively) may perform one or more of the processes of transaction affinity relationship determination process 1000. Moreover, the disclosed implementations are not limited to the sequence and/or number of process steps shown in FIG. 10.

In certain aspects, TAP components 222 may perform one or more processes that access the trip transaction data generated in accordance with the disclosed implementations (e.g., process 800) (Step 1010). TAP components 222 may analyze the trip transaction data and the transaction data associated with the transactions included in the transaction pairs corresponding to the merchant pairs in the trip transaction data to determine merchant affinity count values (Step 1020). A merchant affinity count value, in certain aspects, may reflect the number of times a user account was used in a transaction involving a first merchant and a second merchant. For example, based on the trip transaction data for a user account, TAP components 222 may determine how many times over a determined time range the user performed a transaction at a first merchant followed by a transaction at a second merchant. So, for instance, TAP components 222 may perform processes that determine that an account was used to perform a transaction at a first merchant M1 and then subsequently used to perform a transaction at a second merchant M2, and based on that analysis, increase the count value for that merchant pair (e.g., M1 to M2) by some value (e.g., increase count value by 1 or some code reflecting an increase in the condition being met). Thus, for example TAP components 222 may perform one or more transaction affinity processes to determine based on the analyzed data how many times over a determined time period the record account was used to perform transactions first involving merchant M1 followed by a subsequent transaction involving merchant M2. Based on the analysis, TAP components 222 may perform a count value update process to update the count value to reflect the identified times such a sequence of transactions from M1 to M2 occurred (e.g., update the count value by 1 for each instance, or update a code or data reflecting the increase(s) in the condition being met).

TAP components 222 may store the merchant affinity count value data in a data structure for processing to determine transaction affinity relationships consistent with the disclosed implementations. For instance, TAP components 222 may store the merchant affinity count value data in memory 223, database 227, or another memory accessible by components of transaction affinity platform 110. FIG. 11 shows an exemplary merchant affinity count value data set 1100 that may be generated and stored by the disclosed implementations. The arrangement and configuration of the data set 1100 is not limiting as the disclosed implementations may generate and store data structure(s) in memory in different formats that promote efficient data access, retrieval, and storage.

In certain aspects, merchant affinity count value data set 1100 may include first merchant data 1110, second merchant data 1120, and a merchant affinity count value 1130. First merchant data 1110 may identify the first merchant in a transaction pair involving a user account and second merchant account data 1120 may identify the second merchant in the transaction pair involving the user account. Merchant affinity count value 1130 may reflect the count value determined by TAP components 222 in a manner consistent with the above descriptions of process 1000.

In certain implementations, TAP components may perform one or more processes that determine transaction affinity relationships based on the merchant affinity count values, the transaction affinity data for the transactions for the merchant pairs in the trip transaction data, and/or other transaction data, or other information determined or obtained by transaction affinity platform 110 (Step 1130).

Transaction affinity relationships may be information that reflects one or more relationships between a set of first transaction(s) (e.g., one or more first transactions) and a set of second transaction(s) (e.g., one or more second transactions). In certain aspects, a transaction affinity relationship may include information reflecting one or more of a temporal relationship, a sequential relationship, relationship strength information, etc.

In some aspects, a temporal relationship may include information reflecting an association between the amount of time between a first set of transaction(s) and a second set of transaction(s) for one or more user accounts. For instance, a temporal relationship may include time gap data (e.g., similar to the time gap data discussed above in connection with process 800) that reflects the amount of time between a first transaction and one or more second transactions having one or more common transaction data (e.g., user account, transaction date, merchant identifier, merchant category data, merchant location data, etc.). A temporal relationship may include information that is based on such time gap data that is used to generate information reflecting a time-based relationship (e.g., account 0001 was used 5 times within a one-hour time span at 5 different merchants associated with 2 different merchant categories). Based on the temporal relationship information, the disclosed implementations may generate a transaction affinity relationship message that is translated into another format, such as a user-readable format (e.g., text and/or graphical), compatible for processing by software and/or computing components, etc.

In certain aspects, a sequential relationship may include information reflecting an association between the sequence of transactions. For instance, a sequential relationship may include information reflecting that a first set of transaction(s) (e.g., one or more first transactions) occurred immediately (or within a determined number) prior to, or after, a second set of transaction(s) (e.g., one or more second transactions) (e.g., user account 0001 was used in a transaction involving merchant M1 immediately before a second transaction involving merchant M2). Components of system 100 may be configured to perform process(es) that process this information to generate a transaction affinity relationship to indicate the sequential relationship (e.g., user A visited merchant M1 right before visiting merchant M2; user A visited merchant M1, followed by a visit to merchants M2, M3, and M4).

A relationship strength may be information reflecting a weight (e.g., strength value) associated with one or more transactions. For example, a relationship strength may include a merchant affinity strength relationship reflecting a relationship involving one or more first merchants and one or more second merchants. For instance, a strength relationship may be based on how many times a first merchant was involved in a transaction associated with an account followed by, or preceded by, a second merchant being involved in a transaction. Thus, for example, if a user of client 120A performed a transaction with a first merchant (e.g., merchant M1), and then subsequently performed a transaction with a second merchant (e.g., merchant M2), the merchant affinity relationship strength may be assigned to reflect that sequential relationship (e.g., strength value of 1). The disclosed implementations may update and/or determine the merchant affinity relationship strength based on later similar sequential transactions. Thus, for example, if the user again later performed a transaction with the first merchant (e.g., merchant M1) followed by a second transaction with the second merchant (e.g., merchant M2) one or more additional times, the disclosed implementations may perform process(es) that updates or determines the merchant affinity relationship strength for that merchant pair (e.g., M1 to M2) based on the transaction data (e.g., update the strength value to 3, 4, etc.). The disclosed implementations are not limited to determining a relationship strength based on single merchant pair transactions, or on the sequential nature of such transactions. Alternatively, in certain aspects, the disclosed implementations may determine a relationship strength based on time data (e.g., time gap data), groups of merchants (e.g., transactions from M1 to M2, M3 and/or M4), a merchant sequence group (e.g., M1 to M2, followed by M3 (e.g., a M1-M2-M3 sequence)), etc. Moreover, transaction affinity platform 110 may also determine relationship strengths for transactions that occurred in the reverse direction. For instance, transaction affinity platform 110 may determine a relationship strength between a merchant M1 to merchant M2, and a relationship strength for transactions from merchant M2 to merchant M1, based on the transaction data and transaction affinity data collected and determined in accordance with the disclosed implementations.

The disclosed implementations may determine transaction affinity relationship information based on strength relationship information between merchants and/or user accounts. For example, the disclosed implementations may perform one or more process(es) that determine a set of user accounts involved in transactions associated with certain merchants, within a certain determined time period. For instance, transaction affinity platform 110 may perform one or more process(es) that process transaction affinity information (e.g., time gap data, relationship count data, merchant identifier(s), merchant location(s), user account identifier(s), etc.) to determine a relationship between a set of user accounts and a set of merchant(s) (e.g., 5 different users performed transactions at merchant M1 sequentially before performing a transaction at merchant M2).

Figure 12:
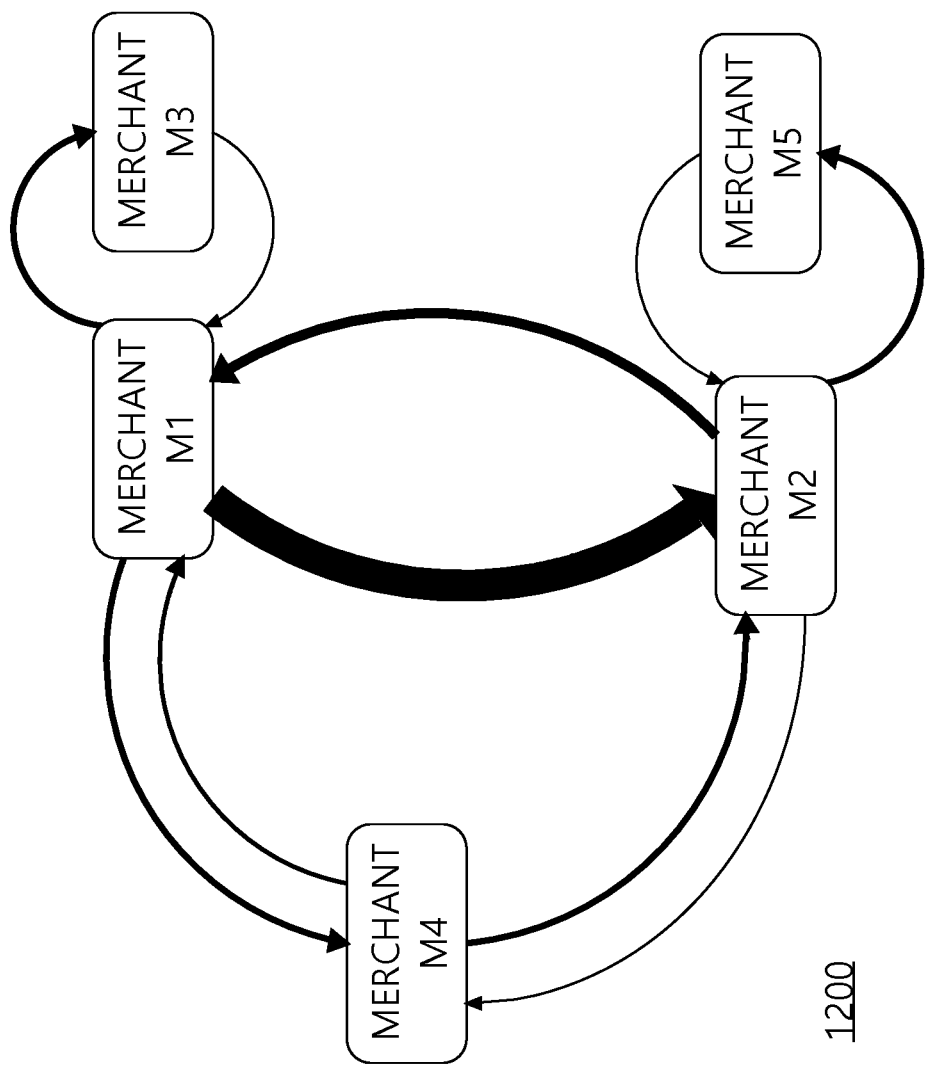
FIG. 12 is a block diagram of an exemplary merchant affinity relationship network, consistent with disclosed implementations.

In certain implementations, transaction affinity platform 110 may perform one or more process(es) that generate and store data that reflect merchant affinity relationship(s) with corresponding affinity strength relationship information. FIG. 12 shows a diagram of an exemplary merchant affinity network for an exemplary set of merchants (M1 to M5) corresponding to a user account that may be monitored and processed in accordance with the disclosed implementations. Transaction affinity platform 110 may perform one or more process(es) that store data that represent information reflected in the merchant affinity relationship network (e.g., data structures including data reflecting strength data, merchant information, and relationships between them, etc.).

For example, as shown in FIG. 12, transaction affinity platform 110 may store data in memory (e.g., memory 223) that reflects relationships between the exemplary merchants M1 to M5. As shown in FIG. 12, the merchant affinity relationship strengths from one merchant to another may vary depending on the transaction data collected by the components of system 100. For instance, the merchant affinity relationship strength between merchant M1 to M2 may be larger than the merchant affinity relationship strength from merchant M2 to M1. This is exemplary shown by the thicker or wider strength affinity relationship links (e.g., thicker/wider relationship links may reflect higher merchant affinity relationship strengths compared to thinner links). Thus, in the exemplary merchant affinity relationship network 1200, a higher merchant affinity strength relationship exists between transactions stemming from merchant M1 to merchant M2 than that for transactions stemming from merchant M2 to M1 (e.g., more transactions occurred that began at merchant M1 and subsequently occurred at merchant M2). As an example, merchant M1 may be a restaurant location and merchant M2 may be an ice cream vendor merchant location. Transaction data collected and analyzed by the disclosed implementations may show that more people visit the ice cream vendor merchant M2 after conducting transactions at the restaurant merchant M1 than the other way around (i.e., transaction data shows that less people visit the restaurant merchant M1 after visiting the ice cream vendor merchant M2). The merchant affinity strength relationship may be generated and stored as an affinity strength value (e.g., RS value) that may be used by transaction affinity processes consistent with the disclosed implementations.

Figure 13:
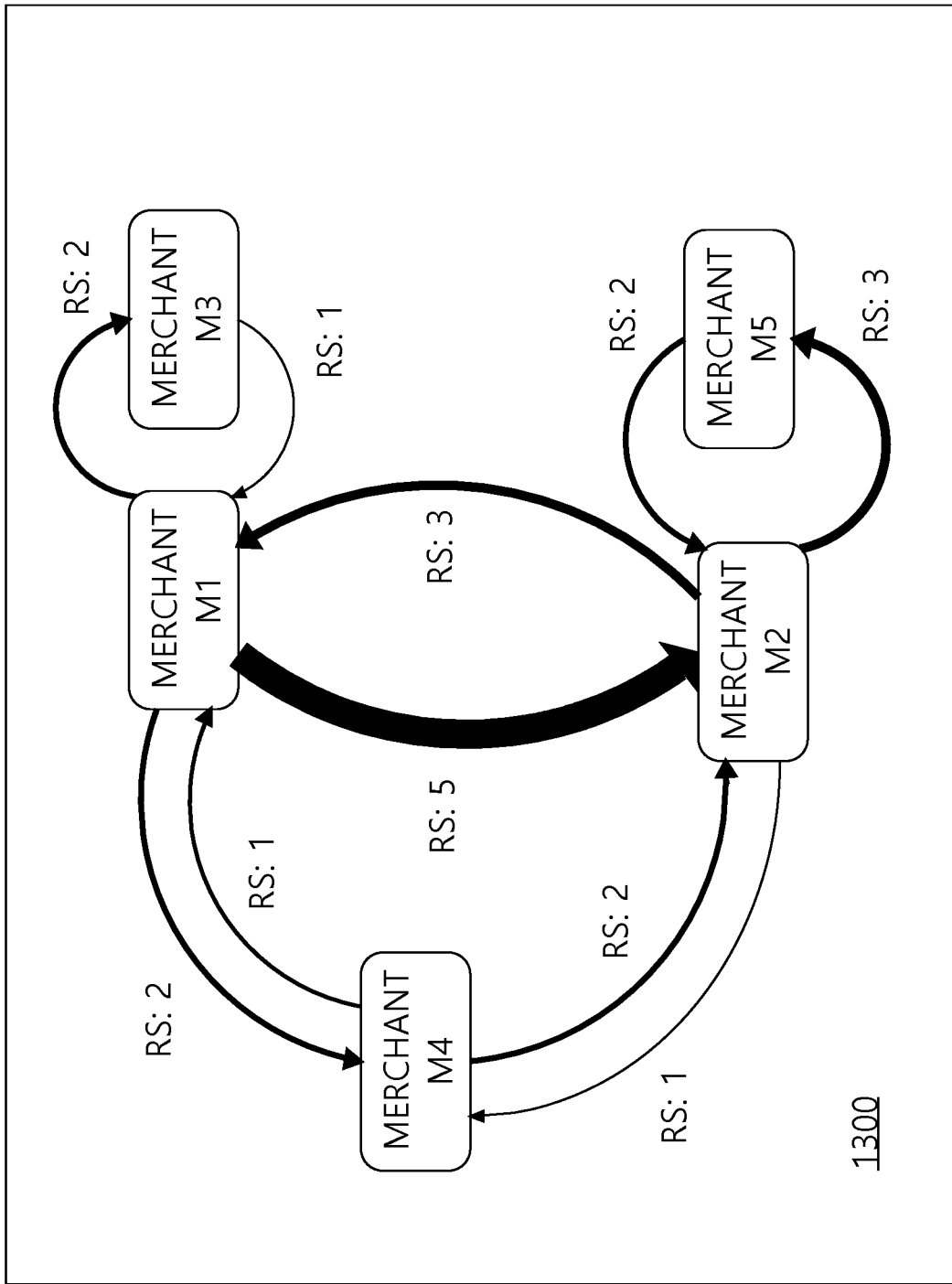
FIG. 13 is a block diagram of exemplary merchant affinity relationships, consistent with disclosed implementations.

In some exemplary aspects, transaction affinity platform 110 may perform process(es) that generate and provide information used to display content in an interface reflecting the merchant affinity strength relationship information. The information provided via the interface may be in graphical form or other formats. For example, transaction affinity platform 110 may generate and provide data used to provide a graphical representation of the merchant affinity relationship network 1200 exemplified in FIG. 12. The interface may be displayed at transaction affinity platform 110 or other components of system 100, such as client 120 and/or merchant 130. Different graphical or textual features may be used to reflect the strength of a relationship. FIG. 13 shows the exemplary merchant affinity strength relationship network in an exemplary interface 1300 that may include graphical and/or textural merchant affinity strength relationships that may be generated and provided consistent with certain disclosed implementations. For example, interface 1300 may include graphical and/or textural representations reflecting merchants (e.g., M1 to M5) and merchant affinity relationships. As an example, interface 1300 may include links having widths corresponding to a strength value of the relationship between two merchant nodes (e.g., M1 to M2) (e.g., the wider or thicker the link, the stronger (or weaker) the relationship).

In addition, or alternatively, interface 1300 may include textual strength relationship information reflecting a strength weight value of the relationship between two merchant nodes (e.g., M1 to M2) (e.g., Relationship Strength "RS" (RS:5)). In some aspects, the relationship representation (e.g., link width and/or RS value) may indicate a sequential and/or temporal relationship between two merchant nodes (e.g., the wider or thicker a link between two merchant nodes in relation to other links in interface 1300, the larger the number of transactions (or merchant visits) occurred in sequence between the two merchant nodes). For example, as exemplified in FIG. 13, the link between merchants M1 and M2 may be wider or thicker than the relationship link between merchants M1 and M4, and thus the graphical representation may reflect that the number of transactions involving merchant M1 sequentially before merchant M2 is greater than the number of transactions involving merchant M1 sequentially before merchant M4. In some aspects, the textual strength weight value (e.g., RS) may numerically reflect a similar relationship (e.g., RS:5 (between merchants M1 and M2) is greater than RS:2 (between merchants M1 and M4)), which may indicate the number of transactions involving merchant M1 sequentially before merchant M2 is greater than the number of transactions involving merchant M1 sequentially before merchant M4. In one aspect, the RS value may reflect the count value determined by process 800 as discussed above, or alternatively, may be a value that is generated based on the count value, but may be a different value that is generated for display in interface 1300.

The disclosed implementations may perform processes that determine transaction affinity relationships to provide additional information or perform additional affinity processes. For instance, one or more components of system 100 may be configured to perform processes for determining recommendation data that may be provided to one or more computing system(s) for subsequent processing and/or review by a user of a receiving computing system.

As one example, transaction affinity platform 110 may perform merchant recommendation processes that determine and provide (e.g., to client 120) merchant recommendation information associated with one or more recommended merchants. In certain aspects, transaction affinity platform 110 may perform the merchant recommendation processes such that it provides real-time recommendation information. For example, transaction affinity platform 110 may provide merchant recommendation information to client 120 for display to a user while the user is determined to be on a shopping trip (e.g., visiting different merchant locations to purchase one or more items or services). For instance, the disclosed implementations may determine that a user account holder (e.g., a credit card account holder of a financial service provider) has purchased items at one or more home improvement merchants in the past hour, and thus determines that the user is currently shopping for home improvement-related items (e.g., the transactions associated with the user involved merchants affiliated with a home improvement merchant category). The disclosed embodiments may be configured to receive and analyze the transaction data for those transactions, determine transaction affinity relationship information based on the analyzed transaction data, and identify and provide merchant recommendation information reflecting a recommendation of another merchant (or merchants) that is also affiliated with a home improvement merchant category, or a related category. In some aspects, the merchant recommendation information may be determined based on merchant category data and other information, such as location data (e.g., the recommended merchant is a home improvement category merchant and is located within a certain distance or location relative to the user's current location (e.g., location of client 120) or the last transaction location (e.g., the location of the merchant involved in the last transaction included in the merchant affinity relationship information for that user).

Figure 14:
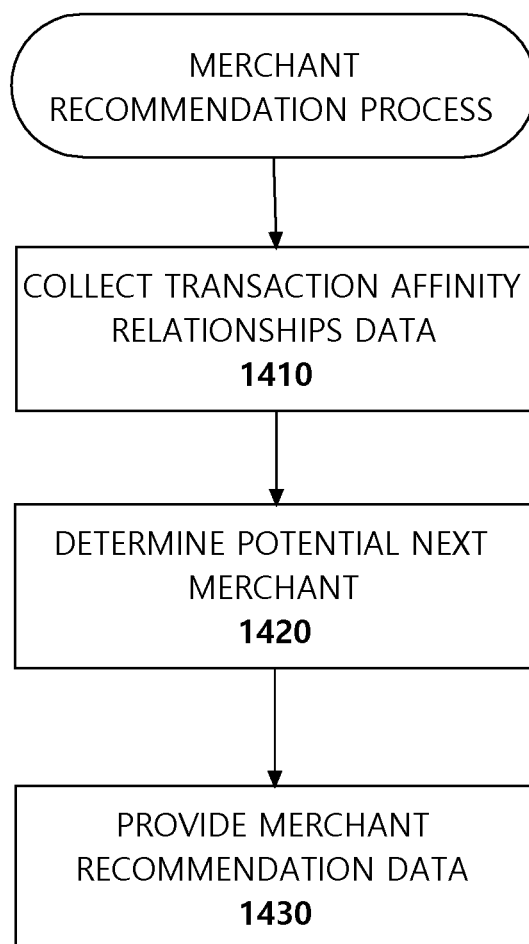
FIG. 14 is a flow chart of an exemplary merchant recommendation process, consistent with disclosed implementations.

FIG. 14 shows a flowchart of an exemplary merchant recommendation process consistent with the disclosed implementations. In certain aspects, transaction affinity platform 110 (or another component in system 100) may perform process(es) that dynamically provide real-time merchant recommendations based on real-time analysis of transactions associated with an account record that have occurred within a specified time period. For instance, in Step 1410, transaction affinity platform 110 may collect transaction affinity relationships data in a manner consistent with the processes discussed above. Transaction affinity platform 110 may monitor and analyze transactions of an account record for a certain time period and perform transaction affinity processes dynamically such that it can provide a merchant recommendation to, for example, the user (e.g., client 120) while the user is in a transaction event (e.g., before a new transaction occurs using the corresponding account). A transaction event may be an event determined by transaction affinity platform 110 (e.g., TAP components 222) based on a series of transactions that have been evaluated during the transaction affinity relationship processes discussed above.

As a non-limiting example, a user (e.g., John) may be a holder of an account provided by an account provider (e.g., credit card account). User John may use the account to perform a first purchase transaction at a first merchant M1 at 9:00 am of Day 1, a second purchase transaction at a second merchant M2 at 9:30 am of Day 1, and a third purchase transaction at a third merchant M3 at 10:00 am of Day 1. Consistent with aspects of the disclosed implementations, components of system 100 (e.g., transaction affinity platform 110, client 120, and/or merchant 130) may collect transaction data from each transaction and perform transaction affinity relationship processes in real-time. Thus, for example, based on the transaction affinity data collected from the three transactions, including merchant data, profile data associated with John, etc., transaction affinity platform 110 may determine that user John is currently on a shopping trip for a category or categories of items or services (e.g., food shopping because M1 is a grocery store, M2 is a coffee shop, and M3 is a butcher shop). Transaction affinity platform 110 may perform processes that identify the set of transactions as a food/grocery shopping transaction event. Transaction affinity platform 110 may also perform transaction affinity relationship processes (e.g., processes consistent with FIGS. 5-11), to determine in real-time transaction affinity relationships between the three merchants for user John. Other types of events can be determined and identified by the disclosed embodiments based on the transaction affinity data of analyzed transactions (e.g., dining event, commuting event, etc.)

At Step 1410, transaction affinity platform 110 may collect transaction affinity relationship information previously determined and stored associated with the account record and/or multiple account records that are monitored and analyzed in a manner consistent with the disclosed implementations. For example, transaction affinity platform 110 may store transaction affinity relationships data for a user account in memory that reflects a historical view of affinity relationships between merchants and the user account used to perform transactions, which was generated consistent with the above-disclosed processes. Moreover, transaction affinity platform 110 may store transaction affinity relationship data for multiple user accounts in memory that reflect a historical view of affinity relationships between merchants for those accounts used to perform transactions. Transaction affinity platform 110 may collect the transaction affinity relationship data (e.g., real-time transaction affinity relationship data based on current transaction event, historical merchant affinity relationships for a user account, and/or historical merchant affinity relationships for multiple accounts) (Step 1410), for use in performing the merchant recommendation process.

Based on the collected transaction affinity relationships data and transaction event data, transaction affinity platform 110 (or one or more component(s) of system 100) may perform process(es) that determine a potential next merchant (Step 1420). For example, transaction affinity platform 110 may analyze transaction affinity relationship information associated with the merchants involved during the transaction event, and access and analyze the historical transaction affinity relationships data collected in Step 1410, to identify one or more potential merchant(s) that meet determined criteria. For instance, following the above example involving user John's transaction event associated with merchants M1-M3, transaction affinity platform 110 may determine, based on the analyzed transaction affinity data, that merchant M3 was the last merchant visited by user John. Transaction affinity platform 110 may analyze the transaction affinity relationship data associated with user John's account and/or the historical merchant affinity information previously determined, to identify one or more merchants that have an affinity relationship strength with merchant M3 (e.g., RS value) that meets a determined threshold value (e.g., RS value of 3 or higher, an RS value that is not below 3, etc.), or is within a certain threshold value range (e.g., RS value between 3 and 5), etc.). For instance, based on the analyzed transaction affinity relationship data, transaction affinity platform 110 may determine that two merchants (e.g., merchants M7 and M8) have a determined affinity relationship value that meets the threshold (e.g., RS value of 3), thus reflecting a minimum relationship strength of transactions that occur from merchant M3 to merchant M7 and from merchant M3 to merchant M8. Based on the analysis, transaction affinity platform 110 may determine M7 and/or M8 as a potential next merchant (e.g., Step 1420).

Based on determined potential next merchant data, the disclosed implementations may generate and provide merchant recommendation data (Step 1430). For example, transaction affinity platform 110 may perform one or more processes that generate information that reflects a recommendation that the user next visit the potential next merchant. Following the example above involving user John, transaction affinity platform 110 may generate a set of data identifying merchant M7 and possibly other data (e.g., M7 location, directions from user John (e.g., based on location of client 120 associated with user John), description data associated with merchant M7 (e.g., type of items/services offered by merchant M7), etc.). Transaction affinity platform 110 may, for example, create a message including the set of data and provide the message to client 120 (or other component associated with user John), for display. For example, transaction affinity platform 110 may generate a message that, when received and processed by client 120, may render content on a display identifying merchant M7 and a message suggesting that the user visit the location given the transaction event. For example, the message may include something similar to or consistent with a message that conveys the type of event and the recommendation relating to that event (e.g., "It looks like you're shopping for groceries today. Merchant [M7], located at [address], offers competitive prices on items that may help you finish your shopping trip early.") Graphical content and other information may be included in the message, such as merchant logos, map information, hyperlinks to other user information or applications, etc. The disclosed implementations are not limited to the type of message, the format of the content displayed, or the information included in the message generated.

While certain examples disclosed above relate to merchant recommendation data that may be directed to a user associated with client 120, the disclosed implementations are not limited to such applications. For example, aspects of the disclosed implementations may include generating and providing recommendation data to or for merchant computing systems (e.g., merchant 130). For instance, transaction affinity platform 110 may perform one or more processes consistent with those discussed above to identify one or more merchants that have a transaction affinity relationship that is above a certain threshold relationship score value and generate and store the data as merchant recommendation data. For example, TAP components 222 may identify two merchants M7 and M8 as potential next merchants that relate to the transactions analyzed during the transaction affinity processes consistent with those discussed above. TAP components 222 may perform process(es) that generate merchant recommendation data that identify merchants M7 and M8 and their respective merchant information in memory. In some implementations, transaction affinity platform 110 may maintain a data structure in memory that stores merchant partner information that identify one or more merchant systems 130 that are authorized to receive the merchant recommendation data generated by TAP components 222.

In some aspects, a merchant associated with a merchant system 130 may partner with an entity hosting transaction affinity platform 110 to receive transaction affinity-based recommendation information relating to other merchants. For example, a corresponding merchant 130 may perform processes that request merchant recommendation data dynamically (e.g., upon generating merchant recommendation data as disclosed above), periodically (e.g., provide merchant recommendation data every hour, day, week, etc.), or responsively (e.g., in response to a request from merchant 130). For example, transaction affinity platform 110 may perform one or more processes that analyze the stored merchant partner information to determine a merchant (e.g., merchant M6) and corresponding merchant system 130 that is authorized to receive generated merchant recommendation data. Transaction affinity platform 110 may perform such authorization processes following generation of recommendation data similar to that disclosed above, based on a predetermined time periodic time period, or in response to a request from a merchant system 130. Once identified and authorization is confirmed, transaction affinity platform 110 may perform processes that generate a recommendation message (e.g., packet of data) suitable for transmission over network 140 that includes the merchant information for the recommendation merchants identified during the merchant recommendation processes consistent with the disclosed embodiments (e.g., merchants M7 and M8). Transaction affinity platform 110 may performs processes that transmits the recommendation message to the merchant system 130 (e.g., merchant 130B) that is associated with the authorized merchant (e.g., merchant M6). The receiving merchant system 130 may perform process(es) that store and analyze the merchant information to perform one or more merchant processes that analyze the received merchant information.

For instance, merchant system 130 for the exemplary authorized merchant M6 may include TAP components similar to those of TAP components 222 that perform processes that generate further recommendation data based on the received merchant information received from transaction affinity platform 110. In one example, the merchant system 130 may determine whether the location of recommended merchants M7 and M8 is within a determined threshold distance (e.g., within X miles, within Y blocks, within Z feet, etc.). If so, the merchant system 130 may generate recommendation data that provides information on suggested partnership opportunities for the authorized merchant with merchants M7 and M8, such as cross-sell opportunities (e.g., merchant M6 may advertise or provide recommendations to visit merchant M7 and/or M8 to customers at the authorized merchant location), and/or vice versa (e.g., merchant M7 and/or M8 may advertise or provide recommendations to customers to visit authorized merchant M6).

The disclosed implementations may perform other recommendation processes based on the information generated by the transaction affinity processes discussed above. For example, the disclosed implementations may determine transaction affinity relationships based on a sequence of transactions associated with an account record that occur before a new transaction associated with the account record occurs. Thus, in one example, and in accordance with the features disclosed above, the disclosed implementations may analyze a transaction group from a transaction affinity data set that includes two or more sequentially related transactions, such as a first transaction T1 associated with a first merchant M1, followed by a second transaction T2 associated with a second merchant M2. In certain aspects, the disclosed embodiments may analyze the transactions T1 and T2 collectively as a virtual single transaction (e.g., VT1), and identify a third transaction T3 associated with a third merchant M3 that occurred following the virtual transaction VT1 (e.g., analyzing the time information for the first transaction T1 or the time information for both transactions T1 and T2). Thus, in some instances, TAP components 222 may perform processes that determine a time gap between the third transaction T3 and the first transaction T1 in the virtual transaction VT1. Consistent with the processes disclosed above, TAP components 222 may analyze the transaction affinity relationship data associated with the account record and/or the historical merchant affinity information previously determined for the account record, to identify one or more merchants that have an affinity relationship strength with merchants associated with the transactions included in the virtual transaction VT1 (e.g., T1 and T2) that meets a threshold value (e.g., RS value of 4 or higher, an RS value that is not below 4, etc.), or is within a certain threshold value range (e.g., RS value between 3 and 5), etc.). For instance, based on the analyzed transaction affinity relationship data, TAP components 222 may determine that two merchants (e.g., merchants M7 and M8) have a determined affinity relationship value that meets the threshold (e.g., RS value of 3), thus reflecting a minimum relationship strength of transactions that occur from the merchants associated with virtual transaction VT1 to merchant M7 and from the merchants associated with virtual transaction VT1 to merchant M8. Based on the analysis, transaction affinity platform 110 may determine M7 and/or M8 as a potential next merchant in a manner consistent with the above-disclosed processes and features of the disclosed implementations.

The disclosed implementations disclosed above may provide technical efficiencies that enhance the operation of one or more aspects of system 100 and user experiences. For instance, by configuring one or more components of system 100 to perform transaction affinity processes consistent with the processes disclosed above, the disclosed implementations may allow a computing system (e.g., transaction affinity platform 110, TAP components 222, client 120, merchant 130, etc.) to dynamically analyze transaction data to provide recommendation data quickly and efficiently. In one example, distributing one or more transaction affinity processes disclosed above across transaction affinity platform 110 and client 120 may conserve memory and processing resources at each respective computing system, while enhancing the ability to deliver dynamic merchant recommendations for display to a user of a client 120. Those skilled in the art would recognize the technical advantages to the disclosed implementations, especially in applications where transaction affinity platform 110 performs transaction affinity processes for many accounts and/or many transactions for one or more accounts. For example, transaction affinity platform 110 and one or more client 120 and/or merchant 130 may perform one or more processes associated with transaction affinity data collection process 600 (FIG. 6), trip transaction data determination process 800 (FIG. 8), transaction affinity relationship determination process (FIG. 10), and/or merchant recommendation process (FIG. 14) to provide merchant recommendation data consistent with the above disclosed implementations.

Aspects of the disclosed implementations efficiently generate and store information for use by the transaction affinity processes disclosed herein to dynamically analyze affinity relationships and provide analysis results, including recommendation data, in real time fashion. Components of the disclosed implementations (e.g., transaction affinity platform 110) may determine, configure, and store merchant information, location information, merchant affinity relationship information, and other data consistent with the disclosed implementations for subsequent analysis. For example, the disclosed implementations may determine and maintain location information associated with monitored transactions and merchants. The merchant location information may include an address, GPS location, coordinate data, or other representation that reflects the location of a merchant that is used by the transaction affinity processes disclosed herein. Components of system 100, such as TAP components 222 of transaction affinity platform 110, may perform one or more processes that generate, configure, and store location information associated with the geographic location of merchant locations, or other components (e.g., client 120).

Figure 15:
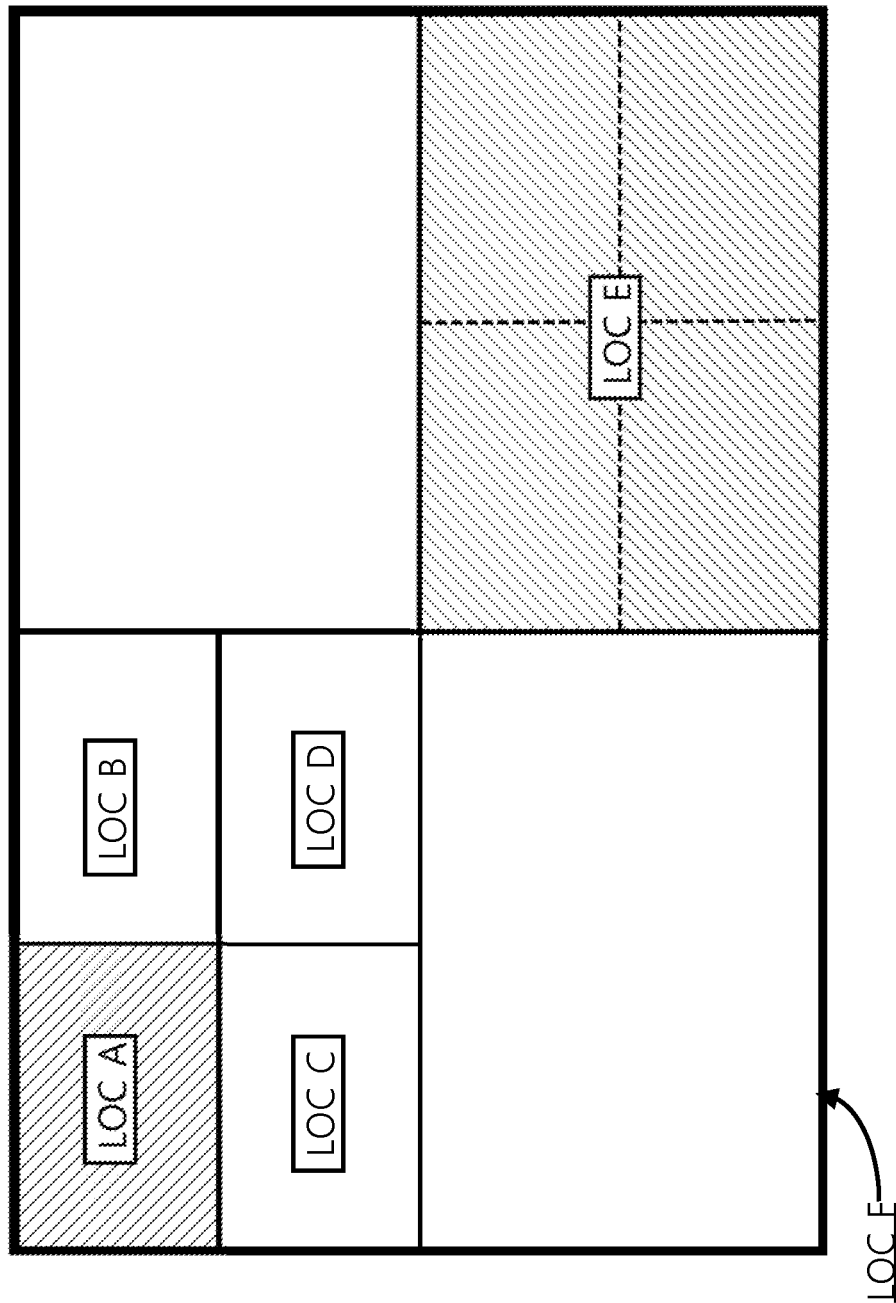
FIG. 15 is a block diagram of exemplary location information, consistent with disclosed implementations.

For example, FIG. 15 shows a block diagram of exemplary location information that may be segmented to provide location information that can be accessed, analyzed, and used by one or more transaction affinity processes consistent with disclosed embodiments. The arrangement and format of the location shown in FIG. 15 is exemplary and the disclosed implementations are not limited to such examples. The disclosed implementations may configure and store location information based on different area boundary criteria, such as an area of certain size (e.g., miles, feet, etc.), a certain region (e.g., zip code, district lines), without limit to the shape, size, or units for defining the area. As exemplified in FIG. 15, a geographic area of a determined location size, shape, boundaries, etc.) may be associated with a location identifier, such as location area F (LOC F, 1530), which in this example is a rectangle of certain size. The disclosed implementations may segment a location area into sub-sections to provide more granular location information. For instance, as shown in FIG. 15, LOC F may be segmented into subsections (also including location LOC E in the fourth quadrant of LOC F for illustrative purposes)). In certain aspects, a subsection may be further segmented into another layer of subsections. For example, as shown in FIG. 15, subsection 1522 includes four subsections (LOC A, LOC B, LOC C, LOC D) in quadrant format. Like LOC F, each subsection may reflect a geographic area of certain size and shape in a non-limiting fashion. Here, sub-sections LOC E and LOC A, LOC B, LOC C, LOC D are shown as rectangles for illustrative purposes only. Moreover, LOC F may reflect a sub-section of a larger area (not shown).

Figure 16:
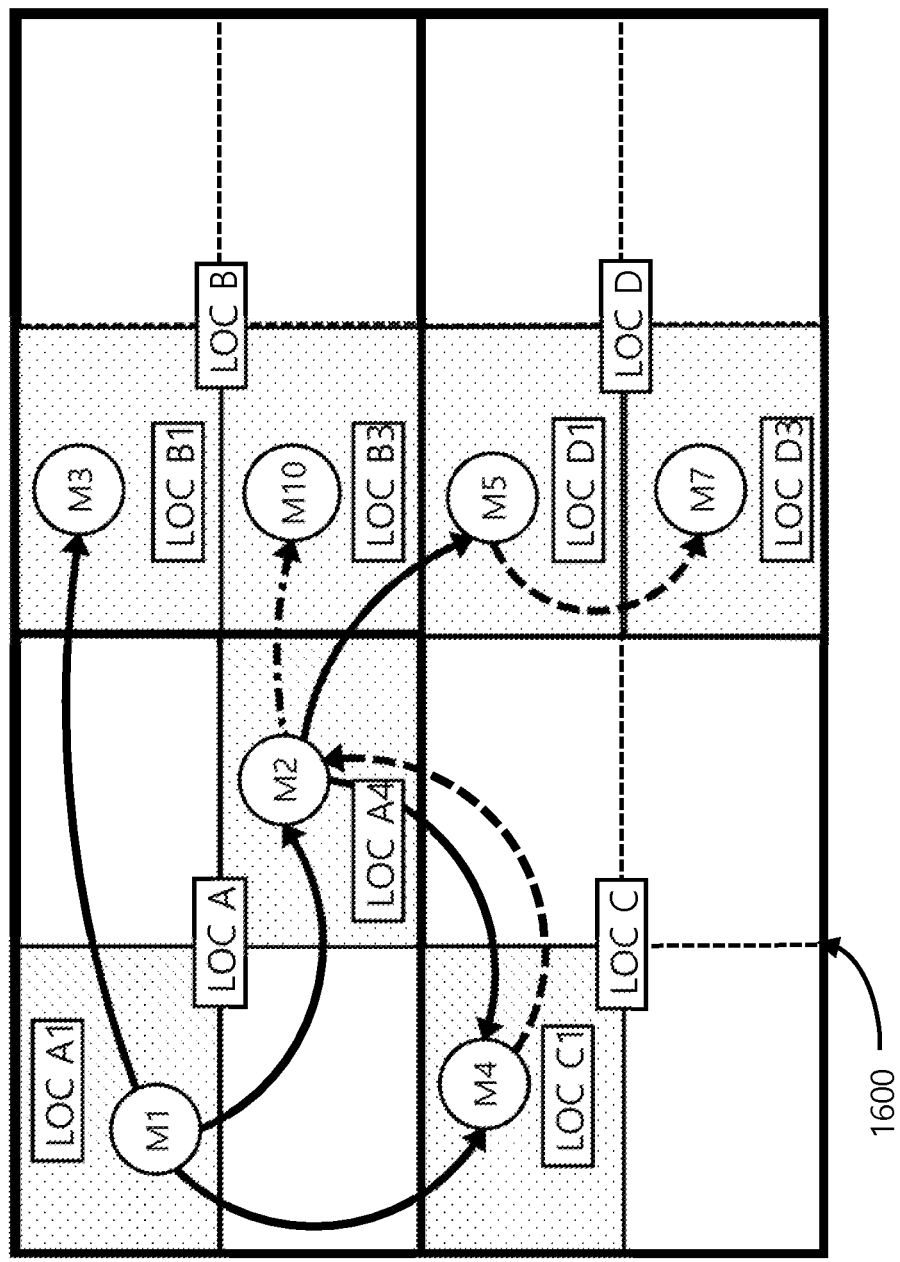
FIG. 16 is a block diagram of an exemplary merchant affinity network, consistent with disclosed implementations.

The disclosed implementations may configure and store organized location information to provide merchant location information that may be used by the transaction affinity processes disclosed herein. For example, FIG. 16 shows an exemplary block diagram of an area 1600 that is divided into subsections LOC A, LOC B, LOC C, and LOC D. In one aspect, TAP components 222 may perform processes that determine and store merchant location information for merchants identified and associated with merchant affinity relationships determined in accordance with the above disclosed transaction affinity processes. For example, as shown in FIG. 16, merchants M1, M2, M3, M4, M5, M7, and M10 may be merchants that that have been involved in transactions that are included in a merchant affinity network 1600 that was determined in accordance with the transaction affinity processes disclosed above. As shown, each merchant in exemplary merchant affinity network 1600 may be associated with a corresponding location. For instance, merchant M1 is in location LOC A1 (subsection of LOC A), merchant M2 is in location LOC A4 (subsection of LOC A), merchant M3 is in location LOC B1 (subsection of LOC B). merchant M4 is in location LOC C1 (subsection of LOC C), merchant M5 is in location LOC D1 (subsection of LOC D), merchant M7 is in location LOC D3 (subsection of LOC D), and merchant M10 is in location B3 (subsection of LOC B).

Merchant affinity network 1600 may also include merchant affinity relationships information. For instance, merchant affinity network 1600 may include information reflecting affinity relationships from merchant M1 to merchant M3, from merchant M1 to merchant M4, from merchant M4 to merchant M2, and so on, as depicted by the arrows in FIG. 16. A merchant affinity relationship between two merchants may reflect a single merchant affinity hop for a merchant affinity chain. Thus, one hop exists in the merchant affinity chain between merchants M1 and M3 in the example shown in FIG. 16. As discussed, affinity relationships may extend beyond two merchants (e.g., may involve more than one hop). Merchant affinity network 1600 shows examples of two-hop merchant chains (e.g., merchant affinity chain M1 to M4 to M2, and merchant affinity chain M2 to M5 to M7). Further, merchant affinity network 1600 may also include a three-hop merchant chain (e.g., merchant affinity chain M1 to M4 to M2 to M10).

For illustration purposes, the single hop chains are depicted in FIG. 16 with solid arrow lines (e.g., the hop from merchant M1 to M3). The two hop chains are depicted with a hashed line for the final hop in the two-hop merchant affinity chain (e.g., the hop from M4 to M2 and the hop from M5 to M7). And, the three-hop chain is depicted with a dot-hash line for the final hop in the three-hop chain (e.g., the hop from M2 to M10). A multiple hop merchant affinity chain may include chains from smaller hop affinities. For instance, the two-hop merchant affinity chain involving merchants M1 to M4 to M2 shown in FIG. 16 includes a hop from merchant M1 to M4 (shown by solid arrow) and the hop from merchant M4 to M2 (shown by the dash lined arrow) to form the two-hop merchant chain for M1 to M4 to M2. Similarly, a hop from merchant M1 to M4 (shown by solid arrow) and the hop from merchant M4 to M2 (shown by the dash arrow reflecting the second hop) and the hop from merchant M2 to M10 (shown by the dot-dash arrow) to form the three-hop merchant chain for M1 to M4 to M2 to M10.

Components of the disclosed implementations may determine and store information relating to merchant affinity network 1600 (e.g., merchant location information, merchant identity information, hop information, merchant category, merchant affinity chain information, affinity values (e.g., RS value), etc.). For instance, TAP components 222 may perform processes that determines the location of each merchant and stores and formats the corresponding location information in memory for subsequent access and processing. TAP components 222 may determine the location of a merchant in different ways. For instance, TAP components 222 may access merchant address information in a data store that was provided by the merchant to transaction affinity platform 110 or extract location data from transaction data that was collected during the transaction affinity data collection process (e.g., as described above for FIGS. 6 and 7). In certain aspects, TAP components 222 may configure the merchant location information in a format that facilitates the dynamic transaction affinity recommendation processes disclosed herein.

Figure 17:
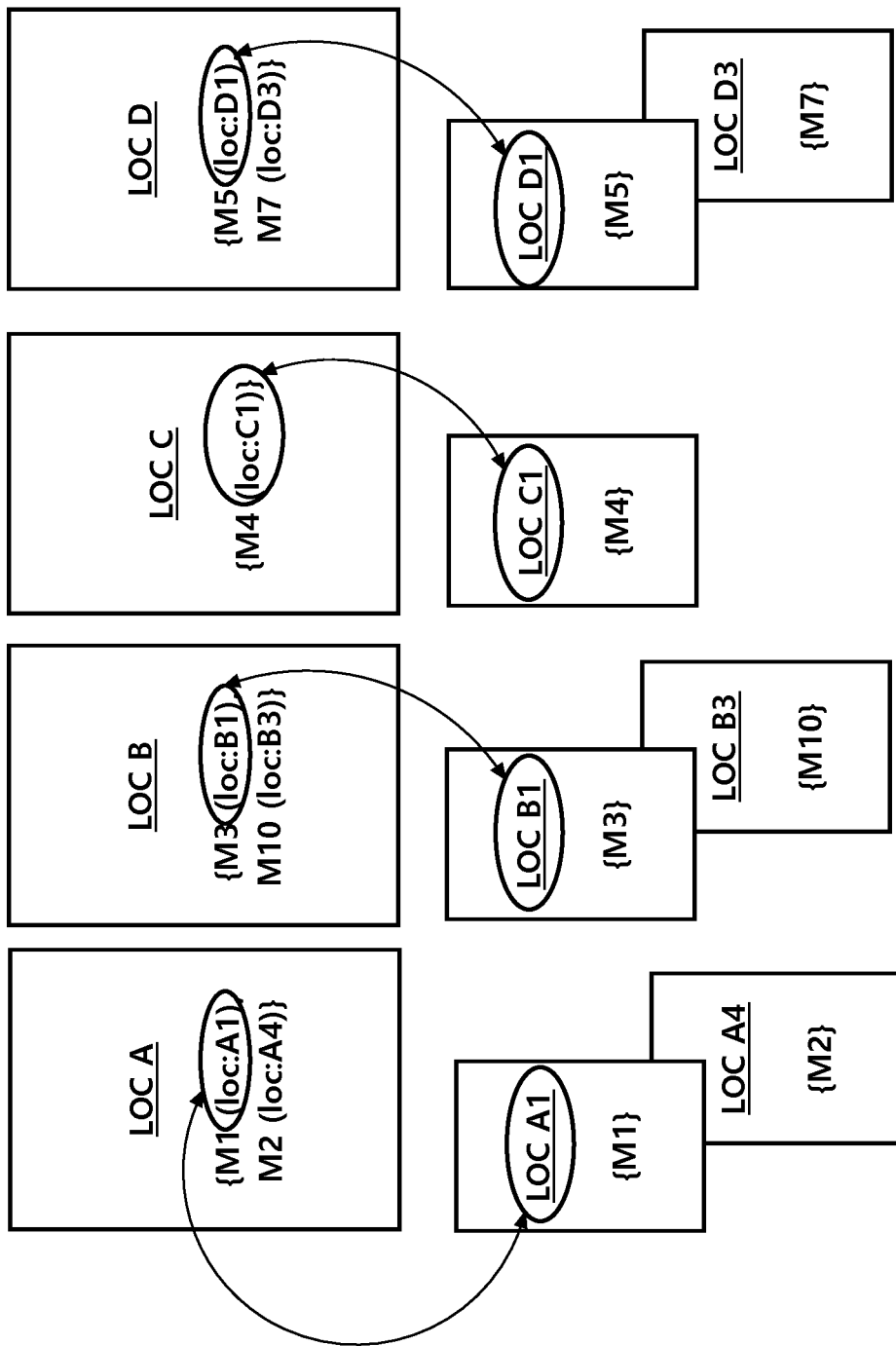
FIG. 17 is a block diagram of exemplary location information stores, consistent with disclosed implementations.

FIG. 17 shows a block diagram of exemplary merchant information that may be stored in one or more merchant stores that may be contained in one or more memories of the disclosed implementations. For instance, transaction affinity platform 110 may store merchant location information in memory 223 and/or TAP components 222 may store merchant location information in memory 323. In certain aspects, as an example, TAP components 222 may configure location information based on location, merchant identifier, or both. In the example of FIG. 17, TAP components may store in memory data structures that include location information for merchants in location areas segmented in accordance with the location segmentation features discussed above. Using the location segments of FIG. 16 as an example, LOC A store may include location information identifying merchants M1 and M4 (consistent with their locations depicted in FIG. 16), LOC B store may include location information identifying merchants M3 and M10 (consistent with their locations depicted in FIG. 16), and so on. TAP components 222 may also generate and store other location segment information associated with each merchant in a location store. For example, LOC A store in FIG. 17 may include data identifying and associated with a subsection location store for merchant M1 (e.g., LOC A1) and location subsection store for merchant M2 (e.g., LOC A4). In some aspects, the disclosed implementations (e.g., TAP components 222) may configure location information to include different levels of location information for use by the disclosed implementations to perform the affinity relationship processes disclosed herein. Information may be linked to other location stores that maintain subsection location information. For instance, TAP components 222 may generate, configure, and store data structures that maintain merchant location information at a subsection level (e.g., LOC A1 store, LOC A4 store, LOC B1 store, LOC B3 store, LOC C1 store, LOC D1 store, and LOC D3 store). The subsection location stores may include data that is linked to data maintained in a related merchant location store (shown by exemplary arrows in FIG. 17) to facilitate access and use of the stored location information to assist the disclosed implementations to perform dynamic affinity relationship processing as described herein.

The disclosed implementations may also generate, configure and store other types of affinity relationship information used to perform dynamic affinity relationship processing as disclosed herein. For example, TAP components 222 may generate, configure, and store merchant information associated with each merchant in a merchant affinity network that is determined in accordance with the transaction affinity relationship processes disclosed herein. For instance, TAP components 222 may generate and configure a merchant information store 1810 that includes merchant information for merchants included in a merchant affinity network. For example, merchant store 1810 may include a merchant store for maintaining information associated with the merchants included in the merchant affinity network 1600 described above in connection with FIG. 16 (e.g., merchant stores M1, M2, M3, M4, M5, M7, and M10). Each merchant store may maintain merchant information such as location information (LOC), merchant category information (CAT), merchant identifier (ID), and other information associated with the merchant.

Moreover, the disclosed implementations may generate, configure, and store merchant affinity relationship information that corresponds to merchant chains included in one or more merchant affinity networks. For example, TAP components 222 may generate, configure, and store merchant affinity relationship information in a merchant affinity relationship store 1820 that includes affinity relationship information for one or more merchant chains. As exemplified in FIG. 18, merchant affinity relationship store 1820 may include data structures that include information that is associated with a corresponding merchant affinity chain, such as the exemplary merchant affinity network 1600 depicted in FIG. 16. In this example, merchant affinity relationship store 1820 may include information associated with each merchant chain of merchant affinity network 1600, such as merchant chain M1→M2. Information associated with each merchant chain (e.g., M1→M2) may include merchant chain identification information 1822, hop information 1824, chain location information 1826, chain category information 1828, and affinity value information 1829.

In one aspect, merchant chain information 1822 may include data that identifies each merchant in a merchant chain and the sequence of the affinity relationship between the merchants in that chain. For instance, the first merchant chain information 1822 shown in FIG. 18 may include data identifying merchant M1 and merchant M2 (e.g., merchant ID data) and data identifying the sequence of the affinity relationship (e.g., transaction sequence that involved merchant M1 followed by merchant M2). In this example, merchant chain information 1822 reflects the merchant affinity relationship between merchant M1 and M2 as shown in the exemplary merchant affinity network 1600 of FIG. 16.

Hop information 1824 may include data reflecting the number of affinity hops between the first and last merchant in a merchant chain. For example, the hop information 1824 for merchant chain M1→M2 reflects a one hop merchant chain, which corresponds to the merchant affinity relationship between merchants M1 and M2 shown in merchant affinity network 1600 of FIG. 16. As a comparison, the hop information for the last merchant chain in merchant affinity relationship store 1820 involving M1→M4→M2→M10 reflects a three-hop chain, like that shown to the merchant affinity relationship involving the sequence of transactions beginning at merchant M1 and ending at merchant M10 in FIG. 1600.

Chain location information 1826 may include data reflecting the location information for each merchant in a given merchant chain. For example, the chain location information 1826 for merchant chain M1→M2 reflects the location of merchant M1 (e.g., LOC A1) and merchant M2 (e.g., LOC A4), which correspond to the locations shown in exemplary merchant affinity network 1600 of FIG. 16. In addition, chain location information 1826 may include additional levels of location information to facilitate location affinity relationship location processing for affinity chains. For instance, the chain location information 1826 for merchant chain M1→M2 also includes location information LOC A, which reflects that merchants M1 and M2 in the merchant chain are also location in location area LOC A, as exemplified in the merchant affinity network 1600 of FIG. 16.

Chain category information 1828 may include data reflecting the merchant category or categories associated with the merchants in a given merchant chain. For example, the merchant category information 1828 for merchant chain M1→M2 reflects the merchant category for merchants M1 and M2 (e.g., CAT 100). In this example, both merchants M1 and M2 may have the same category information. In some instances, a merchant chain may be associated with different categories depending on the category information for the merchants in the merchant chain. As such, chain category information 1828 may include data reflecting the different categories. For example, the chain category information for merchant chain M2→M5→M7 shown in FIG. 18 includes category data (e.g., 100, 300, 100), reflecting the categories for the three merchants involved in the chain. In some aspects, the disclosed embodiments may generate and maintain in merchant affinity relationship store 1820 chain category information that reflects an estimated category for the entire chain. For instance, merchant affinity relationship store 1820 may include a chain category information field that includes a single category that reflects an overall chain category for a given merchant chain. Thus, as an example, TAP components 222 may perform one or more processes that determines the category for merchant chain M2→M5→M7 as CAT 100 based on the categories of each merchant included in that chain, which involve two merchants with CAT 100 values and one merchant having a different category (CAT 300).

Affinity value 1829 may include data reflecting a relationship strength value for the merchant chain. For example, the affinity value 1829 for the first listed merchant chain M2→M2 (e.g., first row in store 1820) may reflect the relationship strength (e.g., RS value, which can reflect count value as discussed above) for the affinity relationship between merchant M1 and M2. In certain aspects, the disclosed embodiments may store the RS value determined by the transaction affinity relationship determination process 1000 discussed above in connection with FIG. 10.

Figure 18:
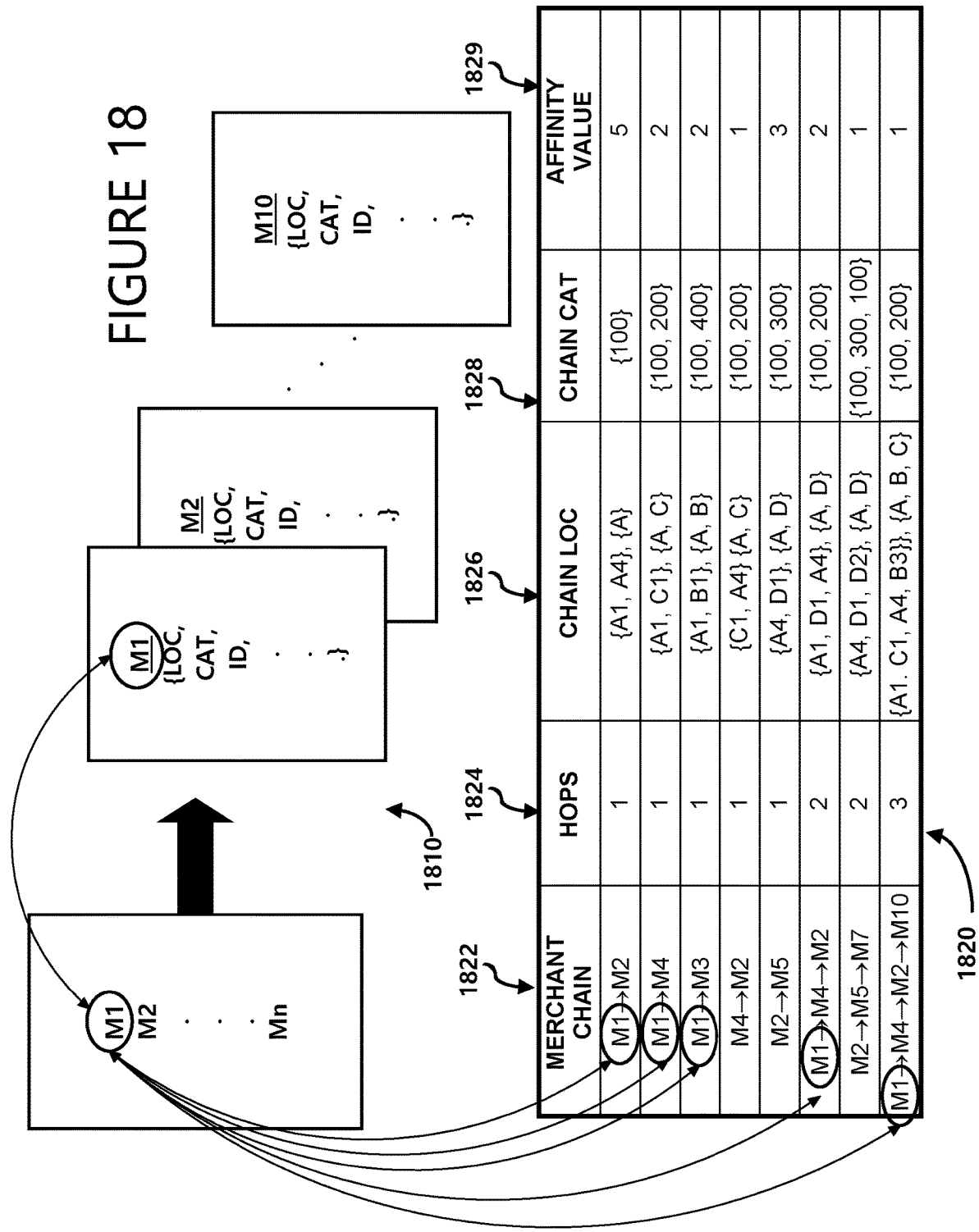
FIG. 18 is a block diagram of an exemplary merchant information store and an exemplary merchant affinity relationship store, consistent with disclosed implementations.

In certain aspects, data included in the data structures generated and maintained by the disclosed implementations may be used to link and reference data to facilitate dynamic affinity processing consistent aspects of the disclosed implementations. For example, as shown by exemplary arrows in FIG. 18, the disclosed implementations (e.g., TAP components 222) may use data, such as merchant identifier data (e.g., M1) to link to other data structures to locate, access, change, analyze, and/or provide merchant affinity relationship data for processing by other aspects of the disclosed implementations. The relationships between information shown in FIG. 18 is not limiting. For instance, merchant affinity relationship store 1820 may link to other data structures, such as the location information stores described above in connection with FIG. 17.

The disclosed implementations may perform one or more processes to generate, collect, analyze, and store merchant affinity relationship information that may be used to perform affinity relationship processes consistent with disclosed implementations. For example, TAP components 222 may perform one or more transaction affinity provisioning processes that access, analyze, process, and provide merchant affinity information. In some implementations, the transaction affinity relationship information may be provided as a service through an Application Programming Interfaces (e.g., API) that allows requests for certain types of affinity information to be provided, received, and processed. For example, transaction affinity platform 110 may perform transaction affinity provisioning process that uses an API that can be also used by client 120 and or merchant 130 to request and receive certain affinity relationship information.

Figure 19:
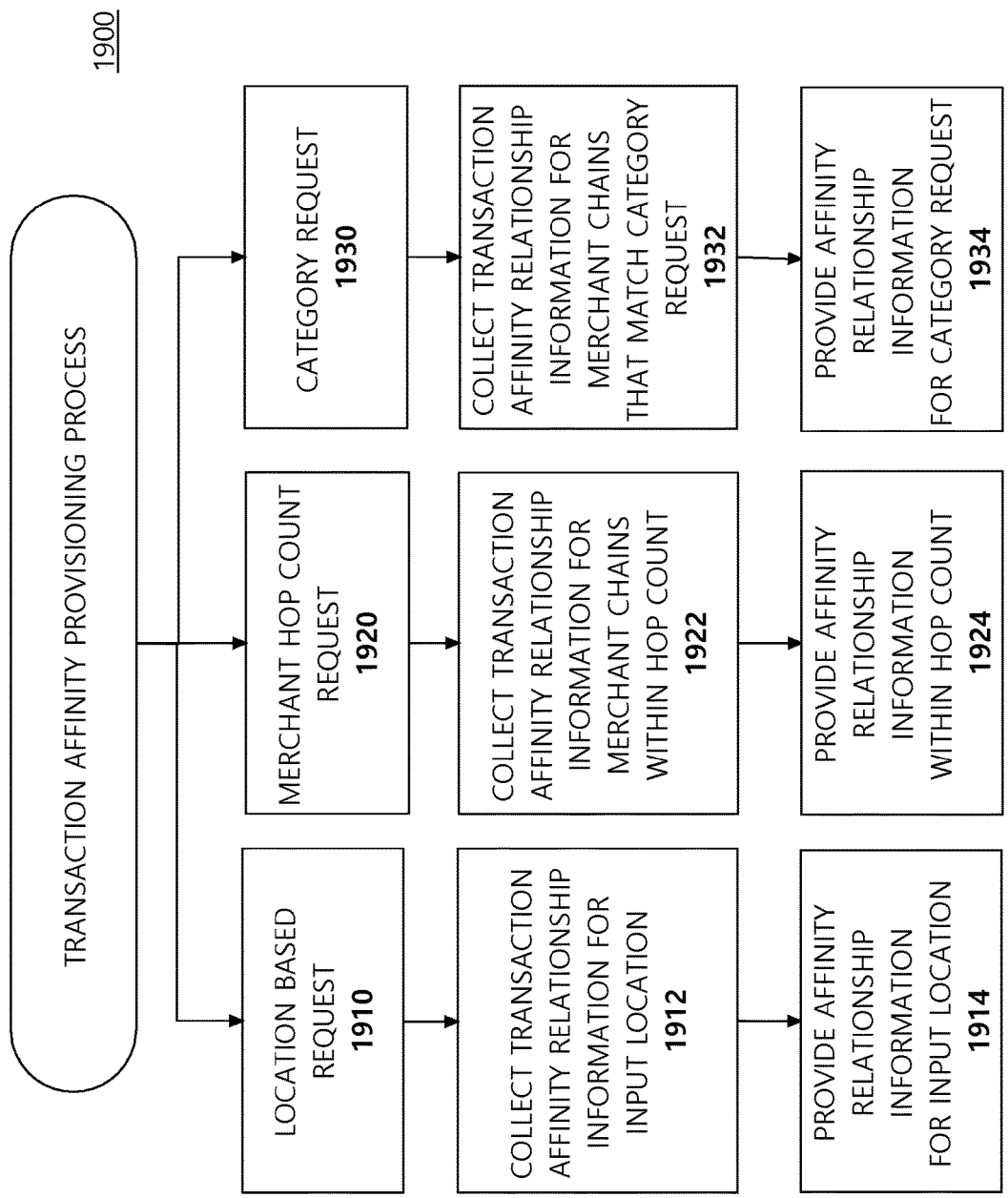
FIG. 19 is a flow chart of an exemplary transaction affinity provisioning process, consistent with disclosed implementations.

FIG. 19 shows a flow chart of an exemplary transaction affinity provisioning process 1900 consistent with certain aspects of the disclosed implementations. Process 1900 may be performed in response to information triggering a request for certain types of merchant affinity information or merchant recommendation information consistent with the disclosed implementations. For example, in certain implementations, TAP components 222 may receive an affinity relationship information request. In some aspects, the request may be received by transaction affinity platform 110 from network 140, such as from client 120 (e.g., client 120A, 120B), or merchant 130 (e.g., merchant 130A, 130B). For example, a user of client 120A may provide input via an interface to request affinity relationship information or merchant recommendation data. In other aspects, transaction affinity platform 110 may perform a process that generates and provides to TAP components 222 an affinity relationship information request based on instructions provided by software components 224. For example, transaction affinity platform 110 may perform a process that periodically generates an affinity relationship information request. Transaction affinity platform 110 may also perform a process that generates an affinity relationship information request in response to a determined event or condition, such as a determined change in merchant location information or other merchant information.

Based on the received affinity relationship information request, TAP components 222 may determine the type of request, and based on that determination, may perform certain processes as exemplified in FIG. 19. For instance, the request may initiate a location based request process, a merchant hop count request process, or a merchant category request process.

A location based request may be a request for all transaction affinities for a specified location. For example, a location based request may identify a request for transaction affinities within a specified location, such as location LOC A in the merchant affinity network 1600 exemplified in FIG. 16. In response to the request, TAP components 222 may determine the request as a location based request (Step 1910), and determine from the received request the specified location (e.g., LOC A). In response, TAP components 222 may collect transaction affinity relationship information for the input location LOC A (Step 1912). For instance, TAP components 222 may access, analyze, identify, and collect merchant affinity relationship information for all merchant affinities associated with LOC A. TAP components 222 may do so, for example, by analyzing merchant affinity relationship store (e.g., store 1820) to determine merchant chains associated with location LOC A (e.g., LOC A chain location information). TAP components 222 may generate merchant affinity relationship information for the determined merchant chains and provide the information for the specified input location (Step 1914). For example, TAP components 222 may collect merchant chain identity information (e.g., 1822), hop information (1824) chain location information (1826), chain category information (1828), and/or affinity value information (1829), and generate merchant affinity relationship information that may be used by one or more processes performed by transaction affinity platform 110, TAP components 222, client 120, and/or merchant 130, depending on the source of the request. In one example, TAP components 222 may generate a location based response that may be transmitted to client 120A, which performs processes for generating and providing the merchant affinity relationship information for the requested location in an interface displayed by client 120A. The merchant affinity relationship information interface may present the information in list format or graphical format (e.g., displaying information reflecting the merchant affinity relationships involving merchant chains M1→M2, M1→M4, M2→M4, M2→M10, M1→M3, M2→M5).

In certain embodiments, TAP components 222 may perform processes to determine and provide merchant affinity relationship information for merchant chains that are only encompassed within the specified location in the location request. For example, TAP components 222 may analyze the transaction affinity relationship information for the input location to determine merchant affinity chains that begin and end within the location specified in the request. For example, instead of providing information reflecting the merchant affinity relationships involving merchant chains M1→M2, M1→M4, M2→M4, M2→M10, M1→M3, M2→M5 for a location input LOC A, the disclosed implementations may perform a process that analyzes merchant affinity relationship store 1820 to determine chain location information 1826 that only includes location information involving the specified location (e.g., LOC A). Thus, following the example above, TAP components may determine and provide affinity relationship information including only merchant chain information reflecting the merchant affinity relationships associated with merchant chains M1→M2, which is the only full merchant affinity fully included in location LOC A, as exemplified in FIG. 16, and identified in exemplary merchant location relationship store 1820.

Returning to FIG. 19, the affinity relationship information request may seek all transaction affinities within a specified number of hops from a specific merchant. In this case, TAP components 222 may determine that the request is a merchant hop count request (Step 1920). In one aspect, TAP components may generate a request for a specified merchant location and a number of hops, which may be provided to the requesting source (e.g., client 120A, a requesting process executed by transaction affinity platform 110, etc.). For example, if the request seeks all transaction affinities within two hops of merchant M1, TAP components 222 may identify the number of hops (e.g., two) and the target merchant (e.g., M1). Based on that information, TAP components 222 may access, analyze, determine, and collect transaction affinity relationship information for merchant chain(s) within the specified hop count from merchant M1 (Step 1922). In one example, TAP components 222 may analyze information in merchant affinity relationship store 1820 to determine the merchant chains with a hop count value of "2" in hop count 1824. TAP components 222 may generate merchant affinity relationship information that may be used by one or more processes performed by transaction affinity platform 110, TAP components 222, client 120, and/or merchant 130, depending on the source of the request. In one example, TAP components 222 may generate a merchant hop count response that may be transmitted to client 120A, which performs processes for generating and providing the merchant affinity relationship information for the requested hop count request in an interface displayed by client 120A (Step 1924). The merchant affinity relationship information interface may present the information in list format or graphical format (e.g., displaying information reflecting the merchant affinity relationships within two hops from merchant M1, such as merchant chains M1→M2, M1→M4, M1→M3, M4→M2, M2→M5 (each involving one hop), and merchant chains M1→M4→M2 and M2→M5→M7 (each involving two hops), as exemplified in FIG. 16 and in store 1820). In other embodiments, TAP components 222 may perform a process that determines and provides merchant affinity relationship information for merchant chains that only involve the specified hop count (e.g., only affinities with two hops, such as merchant chains M1→M4→M2 and M2→M5→M7). In such an example, the affinity relationship information request may seek all transaction affinities having a specified number of hops from a specific merchant, as opposed to within a specified number of hops.

Figure 20:
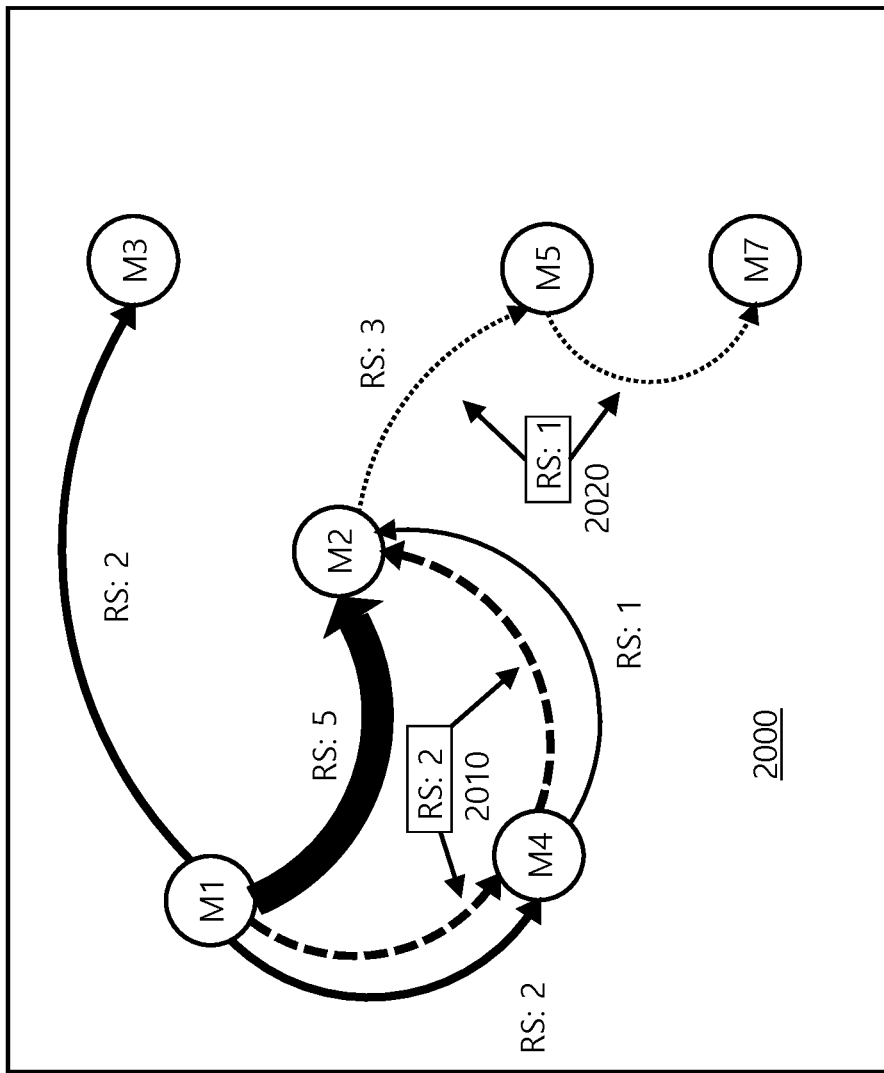
FIG. 20 is a block diagram of an exemplary merchant affinity network, consistent with disclosed implementations.

FIG. 20 shows a block diagram of an exemplary hop count response information 2000 that may be provided by the disclosed implementations. For example, TAP components 222 may generate information that may be used to generate merchant affinity relationship information for merchant affinities within two hops of merchant M1, as discussed above. In certain aspects, hop count response information 2000 may be generated and provided graphically in an interface that is displayed by a display device (e.g., a display of client 120, merchant 130, transaction affinity platform 110). For example, hop count response information 2000 may include representations of a merchant affinity network that includes affinity relationships that meet the criteria of the hop count request. In the example shown in FIG. 20, the affinity information may identify the merchants, the merchant chains, the affinity values, and hop counts for the determined merchant affinity network. For instance, as shown, hop count response information 2000 reflects merchant chains with one hop (e.g., M1→M2, M1→M4, M1→M3, M4→M2, M2→M5 (each involving one hop)), and merchant chains with two hops (e.g., M1→M4→M2 and M2→M5→M7 (each involving two hops)). Hop count response information 2000 may include data reflecting the affinity value (e.g., relationship strength RS) for each merchant chain (e.g., RS: 2 for chain M1→M3, and RS: 2 for two-hop chain M1→M4→M2). Further, hop count information 2000 may include data reflecting the hop count. In the example shown in FIG. 20, one hop merchant chains may be represented by the solid line arrows, a first two hop chain 2010 (e.g., M1→M4→M2) and a second two hop chain 2020 (e.g., M2→M5→M7).

Returning to FIG. 19, the affinity relationship information request may seek all transaction affinities involving a specified merchant category. In this case, TAP components 222 may identify the request as a merchant chain category request (Step 1930) (e.g., request for all affinities involving a home improvement transaction event, a commuting event, etc.) In one example, the category request may include data reflecting a specific merchant chain category. The specified merchant chain category may be provided in category value format (e.g., CAT100, CAT200, etc.), or may include information that may be analyzed to determine the category value. For instance, a user of client 120A may, via an interface provided by TAP components 322, may provide input seeking all affinities relating to home improvement transactions. TAP components 322 may perform a process that analyzes the request to associate it with a category value (e.g., CAT100). Alternatively, TAP components 322 may generate a request that is transmitted to transaction affinity platform 110, and provided to TAP components 222 to analyze and determine the category value. In other examples, a similar type of request may be provided by merchant 130, and processed in kind by TAP components 422, or by a user interfacing with transaction affinity platform 110.

Based on the identified category, in one example, TAP components 222 may collect transaction affinity relationship information for merchant chains that match the category request (Step 1932) and provide affinity relationship information for the category request (Step 1934). For example, TAP components 222 may generate merchant affinity relationship information that may be used by one or more processes performed by transaction affinity platform 110, TAP components 222, client 120, and/or merchant 130, depending on the source of the request. In one example, TAP components 222 may generate a category response that may be transmitted to client 120A, which performs processes for generating and providing the merchant affinity relationship information for the requested category request in an interface displayed by client 120A (Step 1924). The merchant affinity relationship information interface may present the information in list format or graphical format (e.g., displaying information reflecting the merchant affinity relationships involving merchant chain category CAT100, such as affinity information relating the merchant chains involving CAT100, as exemplified in store 1820).

Although aspects of the disclosed implementations are described as being associated with data stored in memory and other tangible computer-readable storage mediums, one skilled in the art will appreciate that these aspects can also be stored on and executed from many types of non-transitory, tangible computer-readable media, such as secondary storage devices, like hard disks, floppy disks, or CD-ROM, or other forms of RAM or ROM. Accordingly, the disclosed implementations are not limited to the above described examples, but instead is defined by the appended claims in light of their full scope of equivalents.

What is claimed is:

1. A system for dynamically providing transaction affinity recommendation data, comprising:
   first transaction affinity platform computing components that execute software stored in a memory to perform transaction affinity operations to generate and provide the transaction affinity recommendation data, the first transaction affinity platform computing components performing the transaction affinity operations to:
   determine that an affinity relationship information request has been generated;
   determine a type of affinity relationship information request based on determining that the affinity relationship information request has been generated,
      the type of affinity relationship information request being associated with at least one of:
      a location based request,
      a merchant hop count request, or
      a merchant category request;
   receive transaction data associated with a set of transactions associated with a first account record,
      the set of transactions occurring within a specified time period during a transaction event;
   analyze the transaction data to generate a transaction affinity data set,
      the transaction affinity data set being associated with the type of affinity relationship information request;
   identify a first pair of temporally related transactions from the transaction affinity data set,
      the first pair of temporally related transactions including a first transaction and a second transaction that occurred later in time than the first transaction, and
      the second transaction being a next transaction;
   analyze transaction affinity data associated with each transaction in the first pair of temporally related transactions to determine first time gap data associated with the first transaction and the second transaction;
   generate trip transaction data based on the first time gap data,
      the trip transaction data being associated with a temporal relationship between the first transaction and the second transaction;
   determine whether the temporal relationship between the first transaction and the second transaction meets a threshold value,
      the threshold value being dynamically set based upon time variances associated with a location of the first transaction and a location of the second transaction,
      the time variances being determined based upon predetermined location category information,
         the predetermined location category information being associated with at least one of:
         an urban location, or
         a rural location;
   generate transaction affinity relationship data based on the trip transaction data,
      the transaction affinity relationship data including a merchant affinity count value data set,
         the merchant affinity count value data set including:
         first merchant data,
         second merchant data, and
         a merchant affinity count value;
   generate, based on the transaction affinity relationship data, first merchant recommendation data associated with a set of merchants that have an affinity relationship with a target merchant associated with at least one transaction in the first pair of temporally related transactions, such that the first merchant recommendation data is generated before a new transaction occurs after the second transaction; and
   transmit, to an interface of a user device associated with the first account record, at least one portion of the first merchant recommendation data to enable an associated selection, of the at least one portion of the first merchant recommendation data, within the interface of the user device while the user device accesses the transaction event,
      the at least one portion of the first merchant recommendation data being transmitted while the user device accesses the transaction event and before the new transaction occurs.

2. The system of claim 1, further comprising that the first transaction affinity platform computing components perform the transaction affinity operations such that the at least one portion of the first merchant recommendation data includes target merchant identification data that identifies the target merchant and target merchant promotion data that reflects a promotion offered by the target merchant for one or more items or services offered by the target merchant.

3. The system of claim 1, further comprising that the first transaction affinity platform computing components perform the transaction affinity operations to:
 identify pairs of temporally related transactions from the transaction affinity data set, the pairs of temporally related transactions including the first pair of temporally related transactions;
 analyze transaction affinity data associated with each transaction in each pair of temporally related transactions to determine time gap data associated with transactions in respective pairs of temporally related transactions;
 for each pair of temporally related transactions:
  identify a merchant pair associated with the pair of temporally related transactions when the time gap data for the pair of temporally related transactions meets a temporal parameter, and generate merchant transaction information reflecting the identified merchant pair and corresponding time gap data in the memory; and
 generate the trip transaction data based on the corresponding time gap data reflected in the merchant transaction information.

4. The system of claim 1, further comprising that the first transaction affinity platform computing components perform the transaction affinity operations such that the merchant affinity count value reflects how many times an account corresponding to the first account record was separately used in transactions involving a first merchant associated with the first transaction and a second merchant associated with the second transaction.

5. The system of claim 1, further comprising second transaction affinity platform computing components that communicate with the first transaction affinity platform computing components to collectively perform the transaction affinity operations.

6. The system of claim 5, further comprising a mobile computing system that includes the second transaction affinity platform computing components and a transaction affinity platform system that includes the first transaction affinity platform computing components, the mobile computing system connected over a network with the transaction affinity platform system.

7. The system of claim 5, further comprising a merchant computing system that includes the second transaction affinity platform computing components and a transaction affinity platform system that includes the first transaction affinity platform computing components, the merchant computing system connected over a network with the transaction affinity platform system.

8. The system of claim 7, further comprising that the merchant computing system receives the first merchant recommendation data from the transaction affinity platform system.

9. A system for providing transaction affinity recommendation data, comprising:
 computing components that execute software stored in a memory to perform transaction affinity operations to receive and process transaction affinity recommendation data, the computing components performing the transaction affinity operations to:
  determine that an affinity relationship information request has been generated;
  determine a type of affinity relationship information request based on determining that the affinity relationship information request has been generated,
   the type of affinity relationship information request being associated with at least one of:
    a location based request,
    a merchant hop count request, or
    a merchant category request;
  receive, over a network from a transaction affinity platform system, merchant affinity recommendation data that is associated with a set of merchants that have an affinity relationship with a target merchant associated with at least one transaction in a first pair of temporally related transactions, wherein the merchant affinity recommendation data is generated by the transaction affinity platform system based on:
   (1) an analysis of transaction data associated with a set of transactions associated with a first account record to generate a transaction affinity data set,
    the set of transactions occurring within a specified time period during a transaction event, and
    the transaction affinity data set being associated with the type of affinity relationship information request,
   (2) an identification of the first pair of temporally related transactions from the transaction affinity data set, the first pair of temporally related transactions including a first transaction and a second transaction that occurred later in time from the first transaction,
    the second transaction being a next transaction,
   (3) first time gap data associated with the first transaction and the second transaction that is generated based on an analysis of transaction affinity data associated with each transaction in the first pair of temporally related transactions,
   (4) trip transaction data that is generated based on the first time gap data,
    the trip transaction data being associated with a temporal relationship between the first transaction and the second transaction,
   (5) a determination of whether the temporal relationship between the first transaction and the second transaction meets a threshold value,
    the threshold value being dynamically set based upon time variances associated with a location of the first transaction and a location of the second transaction,
    the time variances being determined based upon predetermined location category information,
    the predetermined location category information being associated with at least one of:
     an urban location, or
     a rural location, and
   (6) transaction affinity relationship data that is generated based on the trip transaction data,
    wherein the transaction affinity relationship data includes a merchant affinity count value data set,
     the merchant affinity count value data set including:
      first merchant data,
      second merchant data, and
      a merchant affinity count value, wherein the merchant affinity recommendation data is generated by the transaction affinity platform system before a new transaction occurs after the second transaction in the first pair of temporally related transactions; and a display, on an interface of a user device associated with the first account record, that displays at least one portion of the merchant affinity recommendation data, the at least one portion of the merchant affinity recommendation data being transmitted while the user device is in the transaction event and before the new transaction occurs, the interface to enable an associated selection, of the at least one portion of the merchant affinity recommendation data, within the interface of the user device while the user device accesses the transaction event.

10. The system of claim 9, further comprising that the trip transaction data is generated by the transaction affinity platform system based on:

an identification of pairs of temporally related transactions from the transaction affinity data set, the pairs of temporally related transactions including the first pair of temporally related transactions, an analysis of transaction affinity data associated with each transaction in respective pairs of temporally related transactions to determine time gap data associated with transactions in respective pairs of temporally related transactions, and an identification of a merchant pair associated with the respective pairs of temporally related transaction that is generated based on a determination that the time gap data for the respective pair of temporally related transactions meets a temporal parameter.

11. The system of claim 9, further comprising that the merchant affinity count value reflects a number of times an account corresponding to the first account record was separately used in transactions involving a first merchant associated with the first transaction and a second merchant associated with the second transaction.

12. The system of claim 9, further comprising that at least one portion of the merchant affinity recommendation data includes target merchant identification data that identifies the target merchant and target merchant promotion data that reflects a promotion offered by the target merchant for one or more items or services offered by the target merchant.

13. A method for dynamically providing transaction affinity recommendation data performed by first transaction affinity platform computing components that execute software stored in a memory, the method comprising:

determining that an affinity relationship information request has been generated;

determining a type of affinity relationship information request based on determining that the affinity relationship information request has been generated, the type of affinity relationship information request being associated with at least one of:
a location based request,
a merchant hop count request, or
a merchant category request;

receiving transaction data associated with a set of transactions associated with a first account record, the set of transactions occurring within a specified time period during a transaction event;

analyzing the transaction data to generate a transaction affinity data set, the transaction affinity data set being associated with the type of affinity relationship information request;

identifying a first pair of temporally related transactions from the transaction affinity data set, the first pair of temporally related transactions including a first transaction and a second transaction that occurred later in time from the first transaction, the second transaction being a next transaction;

analyzing transaction affinity data associated with each transaction in the first pair of temporally related transactions to determine first time gap data associated with the first transaction and the second transaction;

generating trip transaction data based on the first time gap data, the trip transaction data being associated with a temporal relationship between the first transaction and the second transaction;

determining whether the temporal relationship between the first transaction and the second transaction meets a threshold value, the threshold value being dynamically set based upon time variances associated with a location of the first transaction and a location of the second transaction, the time variances being determined based upon predetermined location category information, the predetermined location category information being associated with at least one of:
an urban location, or
a rural location;

generating transaction affinity relationship data based on the trip transaction data, the transaction affinity relationship data including a merchant affinity count value data set, the merchant affinity count value data set including:
first merchant data,
second merchant data, and
a merchant affinity count value;

generating, before a new transaction occurs after the second transaction, first merchant recommendation data associated with a set of merchants that have an affinity relationship with a target merchant associated at least one transaction in the first pair of temporally related transaction; and transmitting, to an interface of a user device associated with the first account record, at least one portion of the first merchant recommendation data, the at least one portion of the first merchant recommendation data being provided while the user device is in the transaction event and before the new transaction occurs, the interface to enable an associated selection, of the at least one portion of the first merchant recommendation data, within the interface of the user device while the user device accesses the transaction event.

14. The method of claim 13, further comprising providing the at least one portion of the first merchant recommendation data such that it includes target merchant identification data that identifies the target merchant and target merchant promotion data that reflects a promotion offered by the target merchant for one or more items or services offered by the target merchant.

15. The method of claim 13, further comprising:

identifying pairs of temporally related transactions from the transaction affinity data set, the pairs of temporally related transactions including the first pair of temporally related transactions;

analyzing transaction affinity data associated with each transaction in each pair of temporally related transactions to determine time gap data associated with transactions in respective pairs of temporally related transactions;

for each pair of temporally related transactions:
  identifying a merchant pair associated with the pair of temporally related transactions when the time gap data for the pair of temporally related transactions meets a temporal parameter, and
  generating merchant transaction information reflecting the identified merchant pair and corresponding time gap data in the memory; and generating the trip transaction data based on the corresponding time gap data reflected in the merchant transaction information.

16. The method of claim 13, wherein the merchant affinity count value reflects a number of times an account corresponding to the first account record was separately used in transactions involving a first merchant associated with the first transaction and a second merchant associated with the second transaction.

17. The system of claim 1, wherein the first transaction affinity platform computing components, when providing the at least one portion of the first merchant recommendation data, are to provide:
  at least one merchant logo,
  map information, or
  at least one hyperlink.

18. The method of claim 13, wherein providing the at least one portion of the first merchant recommendation data comprises:
  providing:
    at least one merchant logo,
    map information, or
    at least one hyperlink.

19. The system of claim 1, wherein the first transaction affinity platform computing components assign, based on the second transaction occurring subsequent to the first transaction, a merchant affinity relationship strength that reflects that a sequential relationship exists between the first transaction associated with a first merchant and the second transaction associated with a second merchant.

20. The method of claim 13, wherein the first transaction affinity platform computing components assign, based on the second transaction occurring subsequent to the first transaction, a merchant affinity relationship strength that reflects that a sequential relationship exists between the first transaction associated with a first merchant and the second transaction associated with a second merchant.

* * * * *